(12) United States Patent
John et al.

(10) Patent No.: US 11,379,466 B2
(45) Date of Patent: Jul. 5, 2022

(54) DATA ACCURACY USING NATURAL LANGUAGE PROCESSING

(71) Applicant: ACCENTURE GLOBAL SOLUTIONS LIMITED, Dublin (IE)

(72) Inventors: Rajeev John, Pune (IN); Sameer Kumar, Bangalore (IN); Priya Das, Bangalore (IN); Vivek Kumar Pandey, Bangalore (IN); Vismay Vyas, Pune (IN); Srinivasan Ramaswamy, Chennai (IN); Satyaki Bhattacharya, Kolkata (IN); Sanjaykumar Joshi, Bangalore (IN); Jayant Swamy, Bangalore (IN); Aniruddha Ray, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 193 days.

(21) Appl. No.: 16/996,513

(22) Filed: Aug. 18, 2020

(65) Prior Publication Data

US 2022/0058172 A1 Feb. 24, 2022

(51) Int. Cl.
*G06F 7/00* (2006.01)
*G06F 16/23* (2019.01)
*G06N 5/04* (2006.01)
*G06N 20/00* (2019.01)
*G06F 40/216* (2020.01)

(52) U.S. Cl.
CPC ........ *G06F 16/2365* (2019.01); *G06F 40/216* (2020.01); *G06N 5/04* (2013.01); *G06N 20/00* (2019.01)

(58) Field of Classification Search
CPC ............ G06F 16/2365; G06F 16/3331; G06F 16/367; G06F 16/9024; G06F 40/216; G06F 40/295; G06F 40/20; G06F 40/40; G06F 40/226; G06N 20/00; G06N 5/04; G06N 5/02; G06N 5/043; G06N 5/022
See application file for complete search history.

(56) References Cited

U.S. PATENT DOCUMENTS

| | | | |
|---|---|---|---|
| 2018/0018590 A1 | 1/2018 | Szeto et al. | |
| 2019/0102438 A1 | 4/2019 | Murray et al. | |
| 2019/0213258 A1* | 7/2019 | Bacarella | H04L 67/104 |
| 2019/0213260 A1* | 7/2019 | Bacarella | H04L 9/0637 |
| 2021/0037043 A1* | 2/2021 | Lee | H04L 63/1441 |

* cited by examiner

*Primary Examiner* — Mohammad A Sana
(74) *Attorney, Agent, or Firm* — Mannava & Kang, P.C.

(57) ABSTRACT

Examples for enhancing veracity of data are described herein. Data from a repository may be received based on a data receiving rule. From the received data, a first dataset may be generated using statistical modeling. Also, a first data veracity score for the first dataset is generated which is indicative of a degree of usability of the dataset. Another aspect relates to identifying an anomaly in the first dataset, the corrector, for each anomaly, to identify a correction technique from amongst a plurality of correction techniques. Further, a second dataset is generated using the identified correction technique having second data veracity score higher than the first data veracity score.

20 Claims, 16 Drawing Sheets

DATA ACCURACY USING NATURAL LANGUAGE PROCESSING

BACKGROUND

An organization may use an enterprise data management system to store and process data pertaining to the organization in a repository. Such data may include, but not limited to, data related to the personnel in the organization and parameters of operations occurring within the organization. Further, the data may be collected from various sources, such as, for example, applications, devices, and other such sources.

The data stored by the enterprise data management system in the repository may be processed to obtain useful insights related to the organization. As an example, the insight can be a projection to reduce the time required to execute operations. Such insights may be needed to improve the performance and efficiency of the operations. Another example of an insight may be a prediction of a weather forecast based on weather data recorded by the weather recording sensors. However, the insights are dependent on various parameters of the stored data, such as accuracy and completeness of data, which may be known as the veracity of the data.

Accordingly, in order to determine such insights, the enterprise data management system may determine a data veracity score to ensure that the stored data is appropriate for being used to determine insights. For example, data meeting certain criteria, such as consistency in format, can facilitate in gathering insights quickly, whereas data that does not meet such criteria may lead to a futile exercise of gathering insights. Accordingly, determining whether the data is sufficiently appropriate or not for further processing can prevent unnecessary usage of computer resources of the enterprise data management system. Although the data management system may determine a data veracity score, the enterprise data management system is not capable of providing the insights in case the data veracity score does not meet a predefined threshold. Moreover, present enterprise data management systems do not have any means to enhance the data veracity score to render the stored data useful to determine the insights. As a result, the data stored in the repository is rendered useless resulting in wastage of both repository and processing resources used to store the data.

Accordingly, a technical problem associated with the current enterprise data management systems is that they are unable to enhance the data veracity score to prevent wastage of storage and computational resource.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

DETAILED DESCRIPTION

Figure 1:
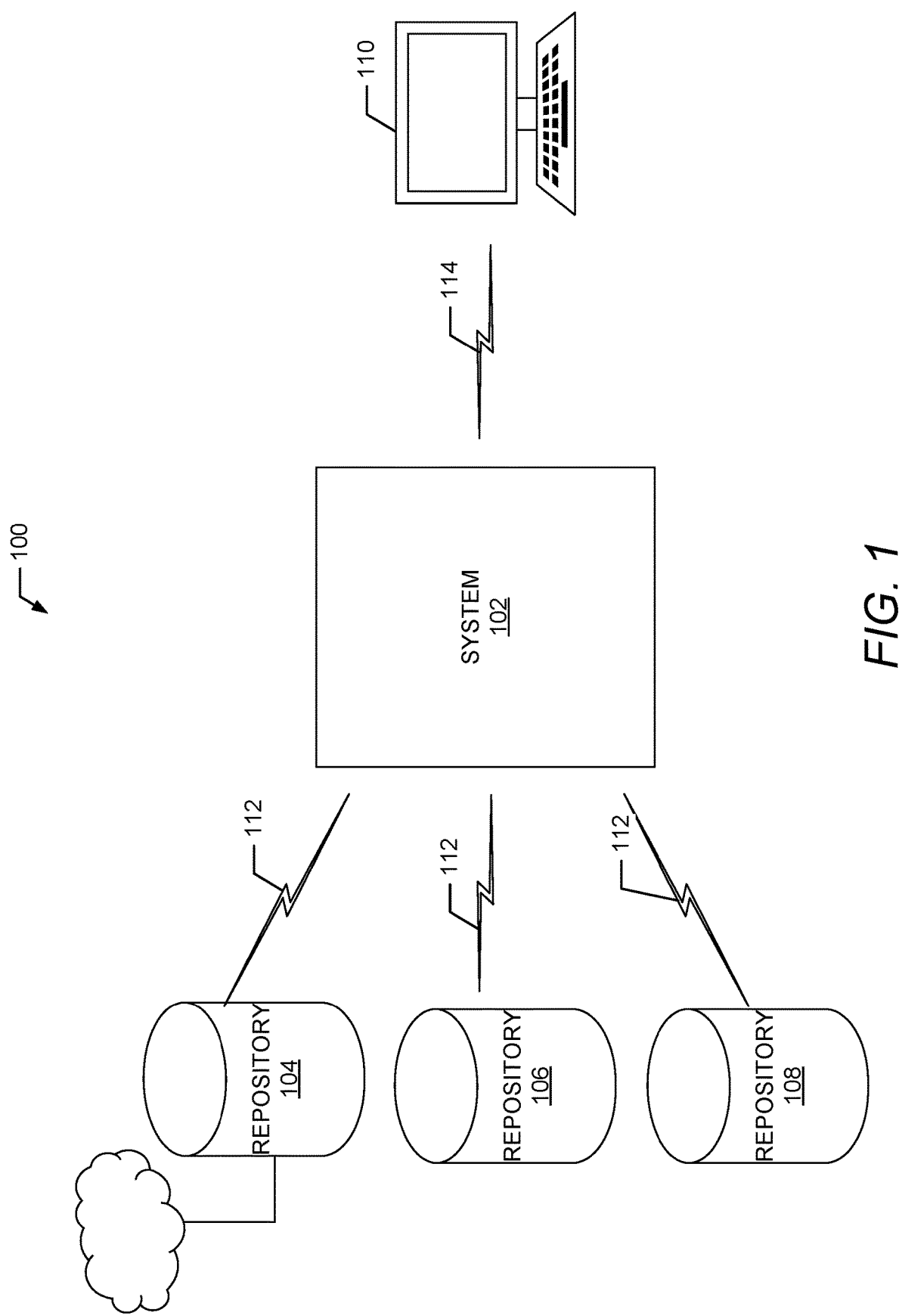
FIG. 1 illustrates a computing environment for improving a dataset, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure relates to aspects of the enhancing veracity of data by analyzing the data and suggesting means to improve a data veracity score. In other words, the present disclosure deals with improving the usefulness of the data. In an example, a technique based on the present disclosure predicts data, for instance, missing data in the dataset, for the dataset to improve the usefulness of the data.

In an example embodiment, the present disclosure relates to a system that includes a retriever that is configured to retrieve data from a repository. The repository can be an online data source or an offline data source depending upon the implementation. Further, the data retrieved from the repository can be in the form of a grid or an array in which the columns define the data headers while the rows identify values that are filled against different data headers. The retriever retrieves the data based on one or more data receiving rules which define the type and amount of data to be retrieved by the retriever. The data receiving rules can be time-based rules that define a date up to which the data needs to be retrieved. The system also includes a profiler that is operably coupled to the retriever and is tasked with creating the first dataset from the received data. In an example, the first dataset is created so that the retrieved data can be used to perform further analysis. The profiler generates the first dataset using statistical modeling.

According to an example embodiment, the system includes a veracity generator that generates the first data veracity score for the first dataset. The first data veracity score determined by the veracity generator is indicative of the usefulness of the data in the first dataset. In other words, the first data veracity score is indicative of a degree of usage of the first dataset to extract insights therefrom. The first data veracity score is also indicative of an anomaly in the first dataset that limits the usefulness of the dataset.

The system may also include a corrector that performs further analysis to improve the usefulness of the data. In an example, the corrector identifies and corrects the anomalies in the first dataset. Further, to correct the anomalies, the corrector identifies a correction technique to correct the anomaly. As an example, the corrector determines the correction technique based on the type of data. In an example, depending upon the data type, the corrector employs different machine learning models. For instance, in case the data type of the first dataset is a numerical dataset, the corrector employs machine learning models, such as the elastic-net Model, K-Nearest Neighbor (KNM) model, a Random Forest model, a Gradient Boosting Machine (GBM) model, and a Light GBM model. In another instance, in case the data type of the first dataset is alphanumeric or categorical, the corrector employs machine learning models, such as the logistic regression model, an SVM model, the Random Forest model, the GBM model, and the Light GBM model. In either case, the corrector identifies the machine learning model that is capable of substantially removing the anomaly. As an example, the term "substantially" in the context of removing the anomalies used herein in the context of the second dataset may be understood as meaning that the second dataset can have as few anomalies as possible in comparison to the first dataset as well as in view of the optimal correction technique which is selected for use on the first dataset to obtain the second dataset.

For example, in case the data is structured data, the corrector runs different aforementioned machine learning models and compares an output of different machine learning models to determine an appropriate machine learning model that provides for best removing the anomaly or, in other words, which best corrects the data set. The machine learning model so selected is determined as the optimized correction technique.

On the other hand, in case the first dataset is form of unstructured data, then the corrector determines means to correct the remove the discrepancies in the first dataset owing to its un-structuredness. The discrepancies in the first dataset can be in the form of the missing data, or incorrect form of the data, or the like. Accordingly, the corrector determines a correction technique to remove the discrepancies. In an example, the corrector performs different correction techniques, such as a k-clustering technique, natural language processing technique, and the word cloud generation technique to remove the anomaly in the first dataset. The corrector, after running the aforementioned correction technique on the unstructured data, compares the output of each aforementioned technique to determine the optimal correction technique.

In an example, the system includes a recommender that is tasked to generate a second dataset from the first dataset, the second dataset being substantially devoid of the anomalies that were present in the first dataset. For instance, the term "substantially devoid" as used herein in the context of the second dataset may be understood as meaning that the second dataset can have as few anomalies as possible in comparison to the first dataset as well as in view of the optimal correction technique which is selected for use on the first dataset to obtain the second dataset. In an example, the recommender is operably coupled to the profiler and the corrector, such that the recommender receives the first dataset from the profiler and the information regarding the optimized correction technique. In operation, the recommender executes the optimized correction technique on the first dataset to generate the second dataset.

According to an example embodiment, post generation of the second dataset, the veracity generator computes a second data veracity score for the second dataset. As may be understood, the second data veracity score has to be higher than the first data veracity score for the second dataset to be used for further processing. In other words, the second dataset has to have greater usefulness than the first dataset for the second dataset to be used for, for example, drawing constructive information from the second dataset. The second dataset may be stored in the repository and may be used in the future to extract insights therefrom. In certain implementations, the system may provide the second dataset from the repository for further analysis. For example, the system may provide the second dataset to a computational resource so that the organization may use the data for operations of the organization, after processing the second dataset in one or more of the manners described herein, and/or the like.

The above-mentioned implementations are further described herein with reference to the accompanying figures. It should be noted that the description and figures relate to implementations, and should not be construed as a limitation to the present disclosure. It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

FIG. 1 illustrates a computing environment 100 for improving a dataset, in accordance with an example embodiment of the present disclosure. The computing environment 100 includes a system 102 to improve or enhance veracity of data, for example, by identifying anomalies in data and correcting the identified anomalies. In an example, the system 102 can be a part of a database management system employed to manage data for different types of work, such as weather prediction modeling, work-flow management in an organization, or the like. The system 102 is designed to ensure that the data pertaining to the processes is sufficiently useful so that intelligible information can be extracted from the data. For instance, the system 102 ensures that the data pertaining to the weather of a region is sufficient for enabling predictions, such as the onset of rains, or a cyclone. The computing environment 100 includes one or more repositories 104, 106, 108 that store the data pertaining to the organization and that can be operably coupled to the system 102. The system 102, in operation, can work on the data set in the repository 104, 106, 108 to improve the veracity of the data set.

Further, the repository can be of different types, such as a cloud-based repository 104, or local-repositories 106, 108 that can be a part of a Local Area Network. The repositories 104, 106, 108 can store the data in both the structured form or in unstructured form. In an example, the structured form of the data is data which is arranged in a pre-defined template, commonly known as the golden source or the master file. The structured data is generally prepared by a database management suite, such as MySQL™, PostgreSQL®, Microsoft Access™, SQL Server™ FileMaker®, Oracle®, RDBMS, dBASE, Clipper, and FoxPro®, or the like. Similarly, in an example, the unstructured data can be data that is not arranged in a grid form or as per a predefined template. Such data can be prepared, for instance, by manually filling data value in an excel spreadsheet or a text document.

According to an example embodiment, the computing environment 100 includes a computing device 110 that may be operably coupled to the system 102. The computing device 110 can be a client computer that may receive an output from the system 102. In another example, computing device 110 can be used to extract useful insights from the data after the system 102 is improved by system 102. A detailed structure of the computing device 102, 110 is explained with respect to FIG. 13.

According to an example, the system 102 can interact with the repositories 104, 106, 108 over a first network 112. Further, the system 102 can interact with the computing device 110 over a second network 112. The networks 112, 114 may be a wireless network, a wired network, or a combination thereof. The networks 112, 114 can also be an individual network or a collection of many such individual networks, interconnected with each other and functioning as a single large network, for example, the Internet or an intranet. The networks 112, 114 can be one of the different types of networks, such as an intranet, local area network (LAN), wide area network (WAN), and the internet. The networks 112, 114 may either be a dedicated network, a virtual network, or a shared network, which represents an association of the different types of networks that use a variety of protocols, for example, Hypertext Transfer Protocol (HTTP), and Transmission Control Protocol/Internet Protocol (TCP/IP), to communicate with each other. An example of networks 112, 114 may include Fiber Channel Protocol (FCP) on Fiber Channel media. In an example, the networks 112, 114 may include a Global System for Mobile Communication (GSM) network, a Universal Mobile Telecommunications System (UMTS) networks, 114, or any other communication network that uses any of the commonly used protocols, for example, Hypertext Transfer Protocol (HTTP) and Transmission Control Protocol/Internet Protocol (TCP/IP). In an example, the networks 112, 114 may be part of a single network, whereas, in another example, the two networks 112, 114 may be separate.

Figure 2:
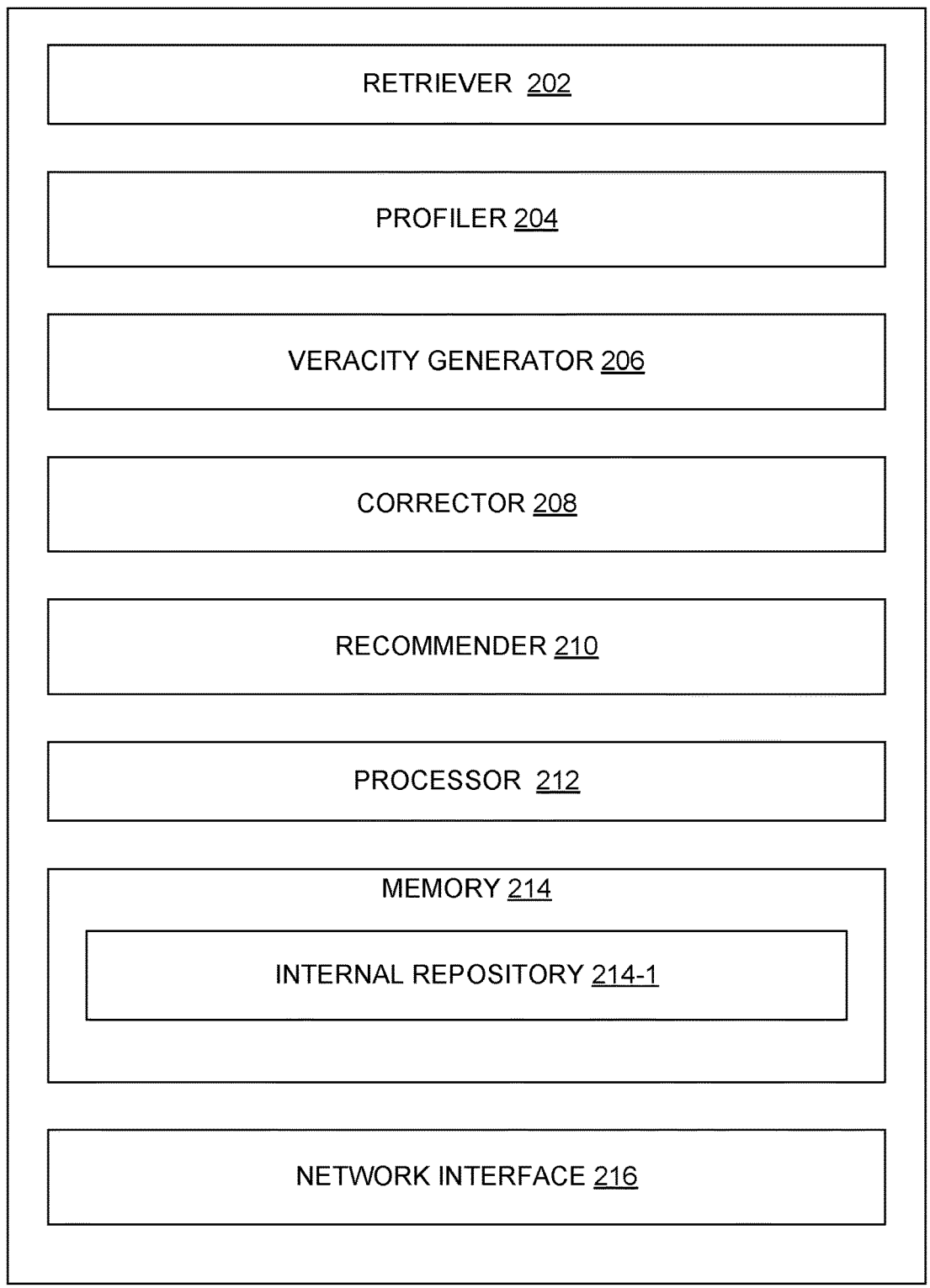
FIG. 2 illustrates a system for improving a dataset navigation, according to an example embodiment of the present disclosure.

FIG. 2 illustrates various components of the system 102, in accordance with an example embodiment of the present disclosure. The system 102 includes various processing components that cooperate with each other to perform a pre-defined task within the system 102. For instance, the system 102 includes a retriever 202 that is configured to retrieve data from one or more repositories 104, 106, and 108. Further, the data retrieved from the repositories can be in the form of a grid or an array in which the columns define the data headers while the rows identify values that are filled against different headers. Further, the data can be in the form of structured data or unstructured data. The retriever 202, depending upon the repository type, can implement techniques to import the data. For instance, the retriever 202 may implement a file swapping technique to pull the data from the repositories 104, 106, and 108.

According to an example, the system 102 may include a profiler 204 that is operably coupled to the retriever 202. The profiler 204 is tasked to perform a preliminary analysis to generate a first dataset from the data retrieved by the data retriever 202. In the illustrated example, the preliminary analysis, for generating the first dataset, may include arranging the received data in a predefined template. In an example, the predefined template is defined and designed by the system 102 for performing the preliminary analysis. During the preliminary analysis, the profiler 204 arranges the retrieved data in the predefined template. Further, the profiler 204 can apply statistical modeling to generate the first dataset. Subsequently, the preliminary analysis may include identifying a pattern in the retrieved data which can be used for further analysis. A manner by which the profiler 204 operates is explained in subsequent embodiments.

The system 102 also includes a veracity generator 206 that computes a first data veracity score for the first dataset generated by the profiler 204. The veracity generator 206 generates the first data veracity score for the first dataset. A manner by which the veracity generator 206 is explained in subsequent embodiments.

According to an example embodiment, the system includes a corrector 208 that performs further analysis to improve the first data veracity score. In another words, the corrector 208 performs the analysis to improve the usefulness of the data. In an example, the corrector 208 identifies and corrects anomalies in the first dataset that affects the first data veracity score. The anomalies, in an instance, can be incompleteness, incorrectness, or inconsistency in the records in the first dataset. To correct the anomalies, the correction identifies an optimal correction technique.

For instance, the corrector 208 based on the type of data that is being corrected employ different techniques. The corrector 208 employs different techniques for different type to prevent remove the anomalies in an efficient way. In case the data is structured data, the corrector 208 runs different machine learning models and compares outputs of the different machine learning models to determine the appropriate machine learning model that provides can adequately remove the anomaly. The machine learning model that can adequately remove the anomaly is determined as the optimal correction technique. In an example, depending upon the data type, the corrector 208 employs different machine learning models. For instance, in case the data type of the first dataset is numeric, the corrector 208 employs machine learning models, such as the elastic-net Model, K-Nearest Neighbor (KNM) model, Random forest model, Gradient Boosting Machine (GBM) model, and Light GBM model. In another instance, in case the data type of the first dataset is alphanumeric or categorical, the corrector 208 employs machine learning models, such as the logistic regression model, SVM model, Random forest model, GBM model, and Light GBM model. In either case, the corrector 208 identifies the machine learning model that is capable of removing the anomaly.

On the other hand, in case the first dataset is an unstructured data, then the corrector 208 employs different techniques are suitable to process the unstructured data owing to its un-structuredness. For instance, the un-structuredness may occur if the data is recorded on different platforms, such as on Microsoft excel or on Microsoft Notepad. In operation, the corrector 208 detects, corrects and remove the discrepancies in the first dataset owing to its un-structuredness. The discrepancies in the first dataset can be in the form of the missing data, or incorrect form of the data, or the like. In an example, the corrector 208 performs different correction techniques, such as a k-clustering technique, natural language processing technique, and the word cloud generation technique to remove the anomaly in the first dataset. The corrector 208, after running the aforementioned correction technique on the unstructured data, the corrector 208 compares the output of each aforementioned technique to determine the optimal correction technique.

In an example embodiment, the system 102 includes a recommender 210 that is tasked to generate a second dataset that is devoid of the anomalies in the first dataset. In an example, the recommender 210 is operably coupled to the profiler 204 and the corrector 208, such that the recommender 210 receives the first dataset from the profiler 204 and the information regarding the optimal correction technique. In operation, the recommender 210 executes the optimal correction technique on the first dataset to generate the second dataset.

The system 102 includes a processor 212 that acts as a main processing unit of the system 102. The processor 212 can be a single processing unit ora number of units, all of which could include multiple computing units. The processor 212 may be implemented as one or more microprocessors, microcomputers, microcontrollers, digital signal processors, central processing units, state machines, logic circuitries, and/or any devices that manipulate signals, based on operational instructions. The processor 212 may further be coupled to a memory 214 which may further include computer-readable instructions for the processor 212 and a repository 214-1 that includes instructions for the processor 212 for the aforementioned components of the system 102. The system 102 also includes a network interface 216 that allows the system to communicate with the repositories 104, 106, 108, and the computing device 110 over the first network 112 and the second network 114.

Example operations of aforementioned individual components of the system 102 is explained hereinafter.

According to an example, the retriever 202 receives the data using various data ingestion techniques. One of the data ingestion techniques is file swapping that can be implemented by the retriever 202 to ingest the data from the repository. The retriever 202 can either receive the data periodically or when a user has requested to ingest the data for the purpose of determining a data veracity score.

An example of conditions for ingesting data is shown in table 1 below:

TABLE 1

| DATABASE NAME | TABLE NAME | COLUMN NAME | DATA TYPE | DATA CONSTRAINTS | TOTAL COUNT |
| --- | --- | --- | --- | --- | --- |
| inventorydb | purchase_cc | customer id | number | unique, not_null | 97318 |
| inventorydb | purchase_cc | account name | string | | 97318 |
| inventorydb | purchase_cc | supplier name | string | | 97318 |
| inventorydb | purchase_cc | payment method | string | letters_of_credit, open_account | 97318 |
| inventorydb | purchase_cc | date of purchase | date | MM-DD-YYYY | 97318 |
| inventorydb | purchase_cc | cust address | string | | 97318 |
| inventorydb | purchase_cc | cust description | string | Unstructured | 97318 |
| inventorydb | purchase_cc | blacklisted | string | Y/N | 97318 |
| inventorydb | purchase_cc | total orders | number | | 97318 |
| inventorydb | purchase_cc | rating score | number | 7.0-10.0 | 97318 |
| inventorydb | purchase_cc | date from | date | | 97318 |

As shown above, the columns define different headers under which the data is ingested. For instance, the first column is the repository name from which the data has been ingested and can represent the name of one or more repositories 104, 106, and 108. Further, the second column indicates the grid or table name whose data value is ingested. Further, the third column indicates the column name of the table mentioned in the second column. Furthermore, the fourth column indicates the data type of the data in the column to be ingested. Furthermore, the fifth column indicates the constraints that are applied to the ingested column. Finally, the sixth column indicates the number of data ingested against each column name after constraints.

The ingested data may be analyzed to generate the first dataset, which can be understood as a dataset in which the data is arranged in such a way that the data can be processed further to determine and improve the dataset. In an example, different types of statistical modeling techniques may be implemented to generate the first dataset. For instance, the retriever 202 may implement exploratory data analysis to generate the first dataset. In addition, the profiled 204 may generate a different type of information that can be used to perform further analysis, based on the first dataset shown in table 1. As an example, the information that can be extracted by the profiler 204 from table 1 is shown in Table 2.

TABLE 2

| COLUMN NAME | DATA TYPE | DISTINCT COUNT | NULL COUNT | MIN VALUE | MAX VALUE | RANGE | NUMERIC | ALPHA NUMERIC | UN-STRUCTURED DATA |
|---|---|---|---|---|---|---|---|---|---|
| customer id | number | 97318 | 0 | 1 | 97318 | | Y | | |
| account name | string | 75981 | 9231 | | | | | Y | |
| supplier name | string | 75981 | 567 | | | | | | |
| payment method | string | 4 | 34126 | | | | | | |
| date of purchase | date | 63712 | 0 | | | | | | |
| cust address | string | 75981 | 6218 | | | | | Y | |
| cust description | string | 97318 | 0 | | | | | Y | Y |
| blacklisted | string | 4 | 0 | | | IN | | | |
| total orders | number | 97318 | 0 | 0 | 31037 | | | | |
| rating score | number | 2189 | 498 | 3 | 9.9 | OUT | | | |
| date from | date | 97318 | 0 | | | | | | |

As shown in table 2, the first column indicates the column extracted by the retriever 202 and corresponds to the third column of Table 1 above. The second column in table 2 indicates the data type of the data in each column name mentioned in the first column. Further, the third column in table 2 indicates the total number of distinct records in each received column. Furthermore, the fourth column in table 2 indicates the number of missing records in each received column. Furthermore, the fifth column and sixth column in table 2 indicates the maximum and minimum value of records in each received column. Lastly, the last four columns indicate the range of values of the records, the data value type as being numeric and alphanumeric, and if any unstructured exist in the received data. Such indications are used by the veracity generator to process the data.

Figure 3:
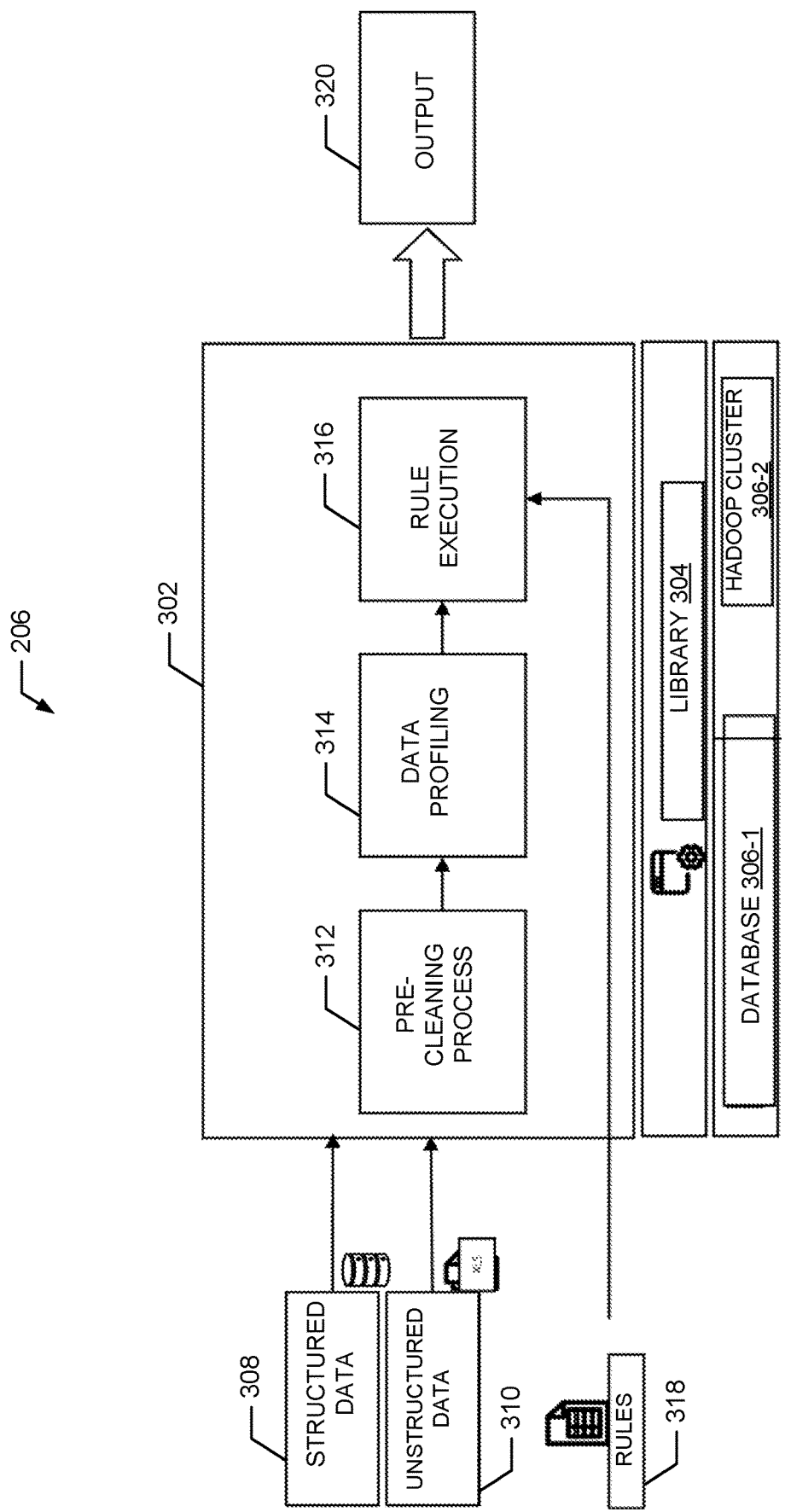
FIG. 3 illustrates a schematic of a veracity generator, according to an example embodiment of the present disclosure.

FIG. 3 illustrates a schematic of the veracity generator 206, in accordance with an example embodiment of the present disclosure. As explained above, the veracity generator 206 is configured to process the first dataset to generate the first data veracity score. The first data veracity score is indicative of a degree of usefulness of the first dataset. In other words, the first data veracity score is also indicative of anomalies that affect the usefulness of the first dataset.

The veracity generator 206 includes a processor 302 and a library 304 that holds different instructions for the processor 302 to process the first dataset for determine the veracity thereof. The veracity generator 206 also includes different components, such as a database 306-1 that can temporarily hold the first dataset while the processor 302 processes the first dataset, and Hadoop cluster 306-2 for storing analyzing unstructured data. In addition, the veracity generator 206 includes interfaces that allow the veracity generator 206 to communicate with the abovementioned components of the system 102 (shown in FIG. 3).

In an example embodiment, the veracity generator 206 performs a variety of steps to generate the first data veracity score. For instance, the veracity generator 206 determines the rules based on which the first data veracity score is generated. The rules are generated by the veracity generator 206 using the indications identified by the profiler 204 (shown in FIG. 3).

The operation of the veracity generator 206 is described hereinafter. The veracity generator 206 receives the data 308, 310, either the structured data 308 or the unstructured data 310. Once received, the veracity generator 206 performs a pre-cleaning process at block 312 to prepare the first dataset for further processing. In another example, the pre-cleaning process can be performed by the profiler 204. Further, the veracity generator 206 performs data profiling as shown by block 314 to generate the rules.

In an example, the veracity generator 206 can use a data profiling technique, such as a described functionality of Pandas python library as shown by block 314, to generate the rules for performing statistical analysis. In another example, the data profiling methodology performed by the veracity generator 206 can follow a combination of a customized and a generic approach, the purpose of both approaches of analysis being to get the statistical insights on data. The customized approach, also referred to as the custom implementation of exploratory data analysis (EDA), refers to the collation of business rules and data quality measures applied at an application level, involving stitching of an initial table to run the data profiling. In the generic approach, on the other hand, we ascertain mean, median, standard deviation, incomplete records, value frequency, top frequent value, missing count, distinct count and co-relation matrix between different columns of the dataset. Therefore, as will be understood, data profiling is also related with the exploratory data analysis referred to above.

Further, as an example, the exploratory data analysis (EDA) performed as part of data profiling is an auto EDA technique and not the standard EDA approach. In the present example, as part of auto EDA, metadata and business or functional rules are loaded into table for further processing. Additionally, application specific rules can also be added. Few of the details which are stored or loaded into the table for auto EDA may include, for instance, table name, column name, datatype, range (if any), constraints (unique, not null, etc.), date formats allowed, time-zone to be maintained, custom constraints set as per business, and unstructured column flag. Once the table is loaded with sufficient information, it can be used on the datasets to perform custom profiling. Accordingly, in said example, business rule-based profiling is performed along with the generic data profiling methodology and the combination of both provides numerous insights into the underlying dataset. As a result of the data profiling, the veracity generator 206 can generate the rules for further analysis.

One of the generated rules can be a determining a threshold of completeness of data in the first dataset based on the indications prepared by the profiler 204. Once the rules are generated, the rules are then executed on each column of the first dataset using statistical modeling at block 316. In another example, the rules predefined and may be provided, as shown by block 318. Based on either or both the rule, the veracity generator 206 uses the statistical modeling technique to generate the data veracity score as the output 320.

The output 320 is shown in table 3 below.

TABLE 3

| COLUMN | IP_ADDRESS | JOB_TITLE | COMPANY CODE |
|---|---|---|---|
| DATA | 23.114.72.3 | Assistant Professor | AA |
| | 170.191.43.251 | Budget/Accounting | NM |
| | 232.42.112.215 | Project Manager | OI |
| | | Dental Hygienist | HG |
| | | Research Nurse | RR |
| | | Database Admin | ND |
| | | Analysis Engineer | LK |
| | 156.143.165.193 | Chemical Engineer | BC |
| | 144.210.244.178 | Web Designer III | BC |
| | 109.16.53.229 | Help Desk Operator | BC |
| VERACITY | COMPLETENESS 60% | VALIDITY 60% | UNIQUENESS 70% |

As shown, for the first column, the veracity generator 206 determines the completeness and validity as 60% of the first column and second column while the veracity generator 206 determines the uniqueness as 70%. This data is then used by the corrector 208 to process the first dataset further.

Figure 4:
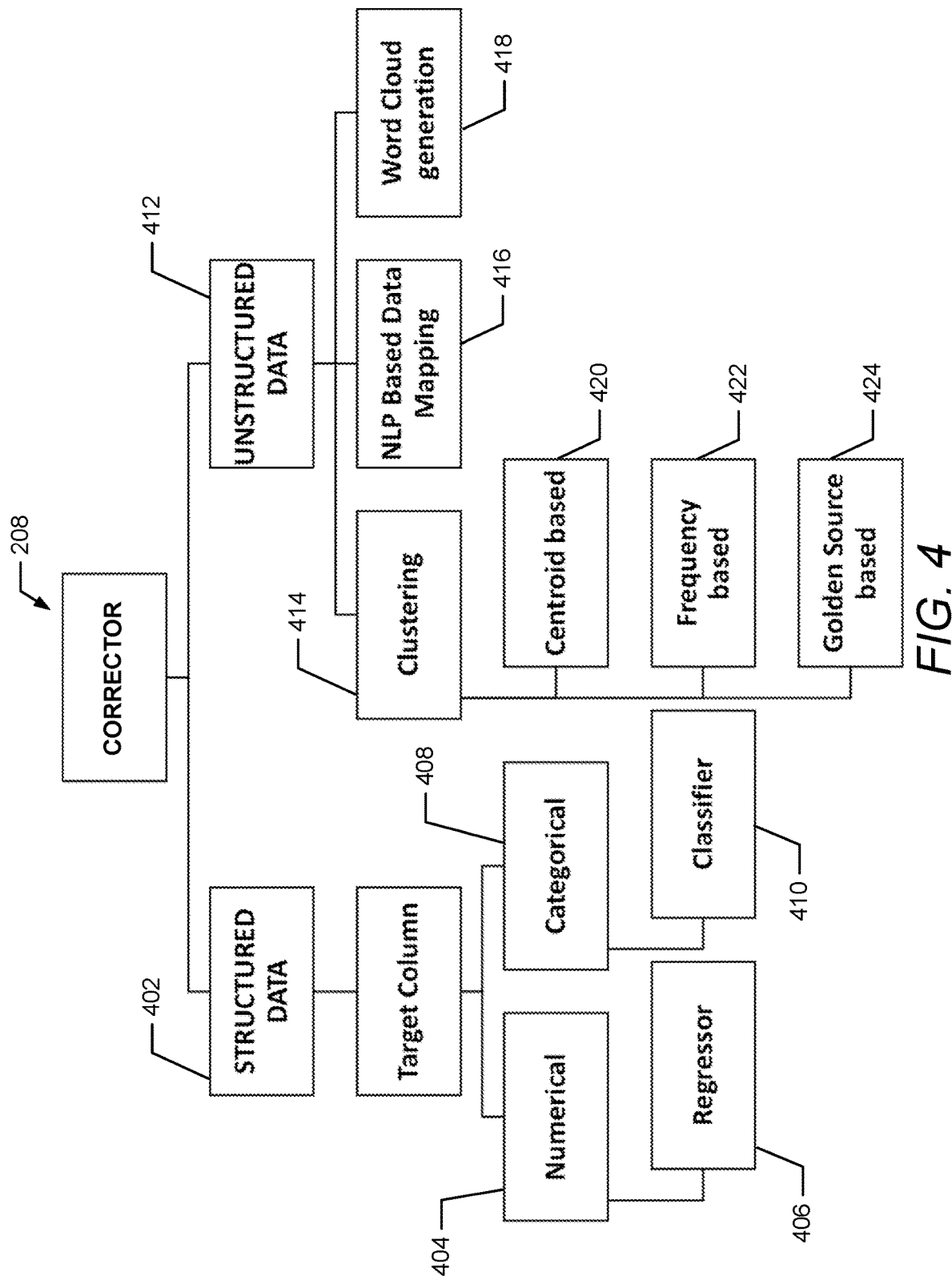
FIG. 4 illustrates functional aspects of a corrector for improving a first dataset, according to an example embodiment of the present disclosure.

FIG. 4 illustrates an overview of the operation performed by the corrector 208 for improving the first dataset, in accordance with an example embodiment of the present disclosure. The corrector 208 is tasked to identify anomalies in the first dataset and identify an optimal correction technique to remove the anomalies. The anomalies can be one of the incomplete data, incorrect data, or inconsistent data. Further, the corrector 208 performs different sets of operations on the type of first dataset owing to the data type of the records in the first dataset. For instance, in case the first dataset is structured data, the corrector 208 implements the steps in branch 402. In the illustrated example, the corrector 208 determines the data type of data in each column in the first dataset. The corrector 208 may refer to the information mentioned in table 2 to determine the data type.

According to an example, in case the data type is numerical as mentioned in step 404, the corrector 208 performs a regression technique as mentioned in step 406. On the other hand, in case the data type is alphanumeric, the corrector 208 executes a classifier technique as mentioned in branch 408. On the other hand, in case the data type is categorical, the corrector 208 performs the steps in branch 408. For instance, the corrector 208 performs text a classifier technique as mentioned at step 410 to identify the optimal correction technique.

According to an example, in case the data type of the first dataset is unstructured data, then the corrector 208 applies the steps in branch 412. For instance, the corrector 208 may apply either of the data clustering mentioned at step 414, natural language processing-based mapping mentioned at step 416, or word cloud generation technique mentioned 418. Further, in case the corrector 208 applies the data clustering technique, the corrector 208 applies additional operations as mentioned at steps 420, 422, and 424. The detail of each technique is explained in detail in subsequent paragraphs.

Figure 5A:
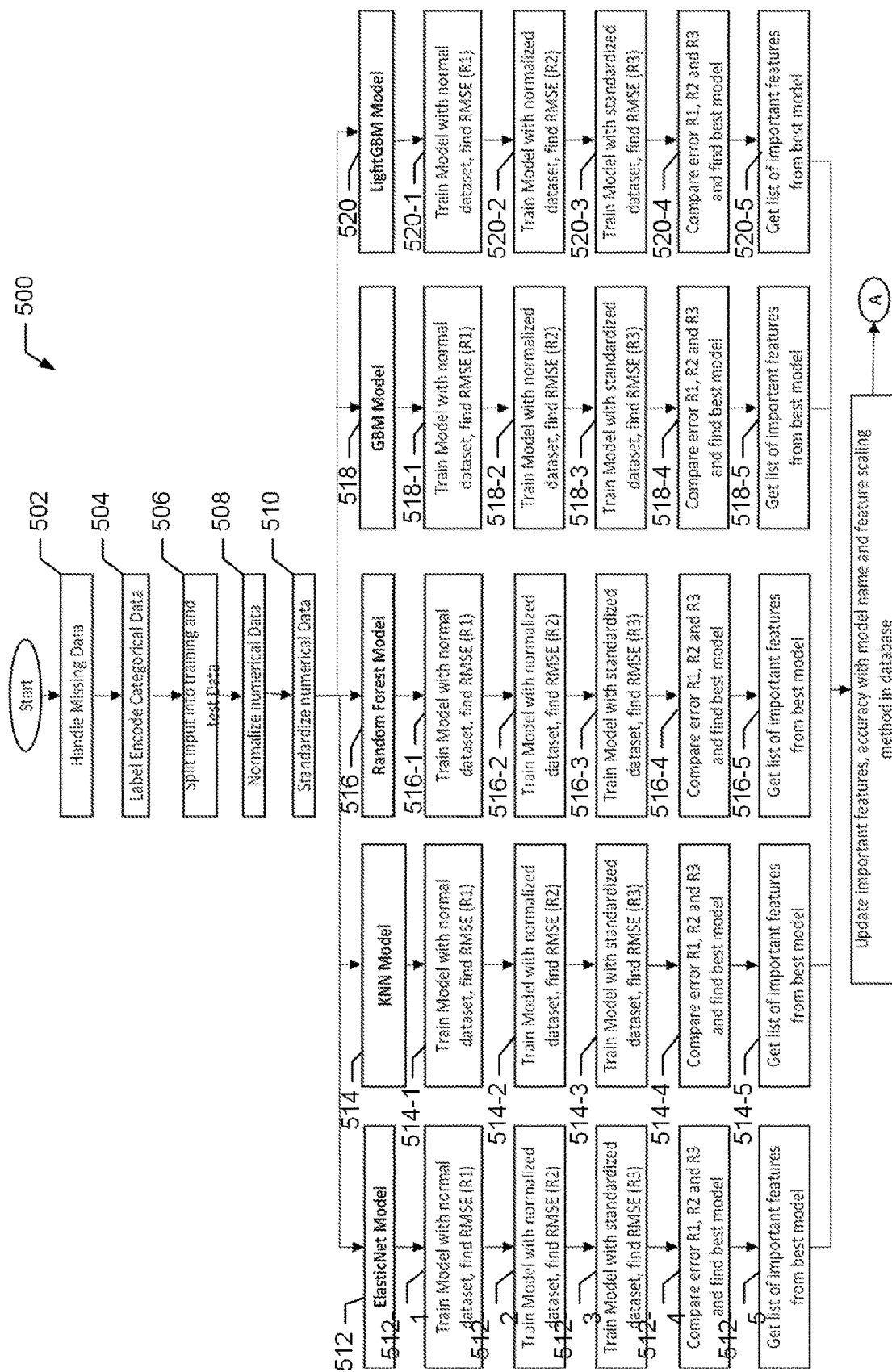
FIGS. 5a and 5b illustrate a method for identifying an optimal correction technique by the corrector for numerical data, according to an example embodiment of the present disclosure.
Figure 5B:
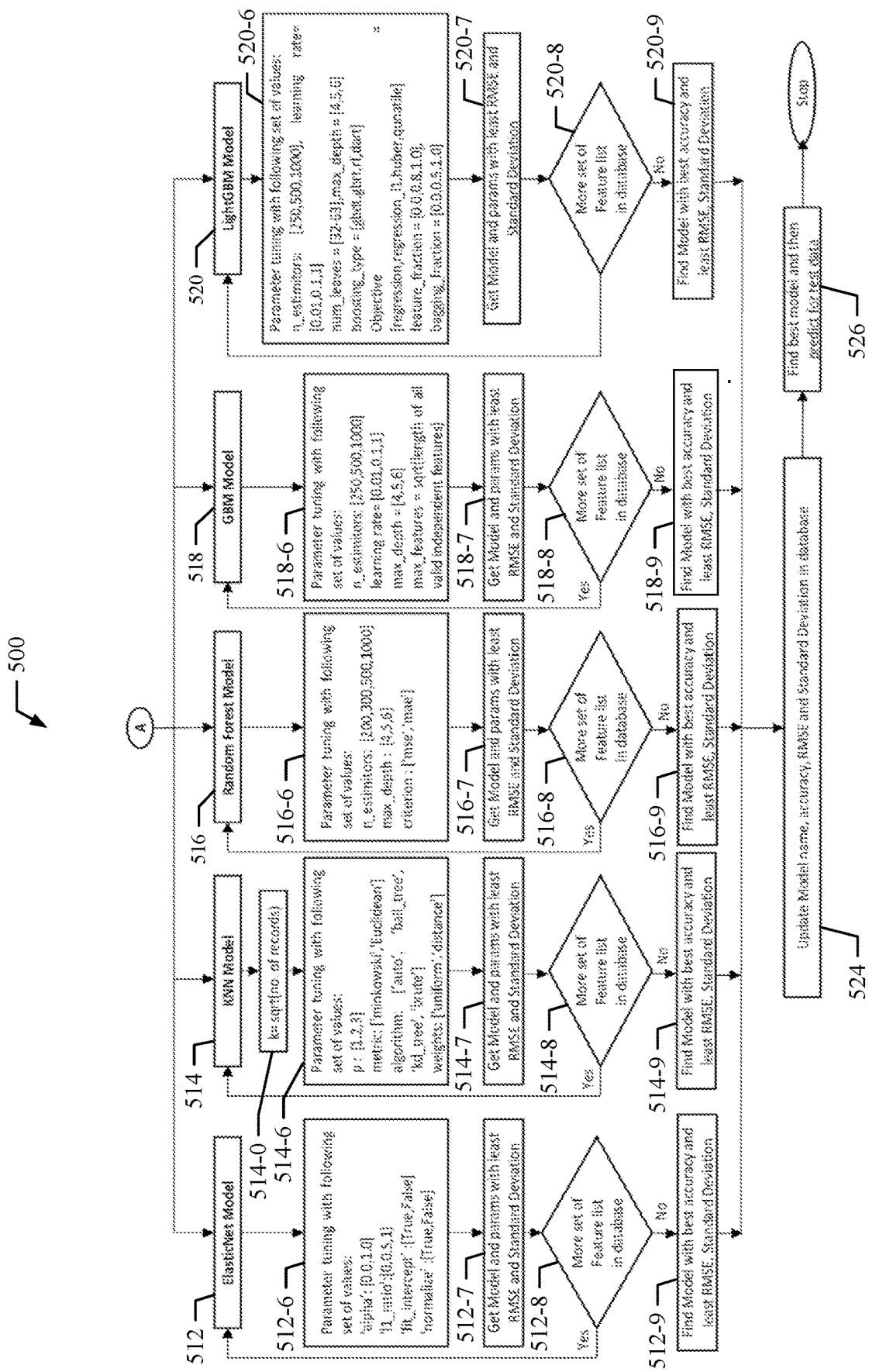

FIGS. 5a and 5b illustrate a method 500 for identifying an optimal correction technique by the corrector 208, in accordance with an example embodiment of the present disclosure. The method 500 can be implemented by the corrector 208. The method may be described in the general context of computer-executable instructions embodied in a computer-readable medium. Generally, computer-executable instructions can include routines, programs, objects, components, data structures, procedures, modules, functions, etc., which perform particular functions or implement particular abstract data types. The method may also be practiced in a distributed computing environment where functions are performed by remote processing devices that are linked through a communications network. In a distributed computing environment, computer-executable instructions may be located in both local and remote computer storage media, including memory storage devices.

The order in which the method is described is not intended to be construed as a limitation, and any number of the described method blocks can be combined in any order to implement the method or an alternative method. Additionally, individual blocks may be deleted from the method without departing from the spirit and scope of the methods, systems, and devices described herein. Furthermore, the method can be implemented in any suitable hardware, software, firmware, or combination thereof.

Method 500 begins at step 502 where the missing data in the first dataset is handled. As part of handling the missing data, the anomaly in the first dataset is identified. The identification of the anomalies may be based on the data veracity score generated by the veracity generator 206. Upon identification of the anomalies, the method moves at step 504, at which the data in the first dataset is labeled and encoded so that the machine learning model can be applied to the data in the first dataset. Thereafter, at step 506, the first dataset is split into training data and test data. The training data may be understood as the data that is used to train the machine learning model while the test data or the validation data is the data that is used to compare an output of the machine learning model after the machine learning model is trained. An example of the test data can be the data that is complete, correct, and unique. Once the first dataset is split between the training dataset and test dataset, the method 500 moves to the next block 508 where the training data is normalized. The training data can be normalized by a variety of known techniques that rescales the value of each record in the range between 0 and 1. Thereafter, at block 510, the training data is standardized in the structure of the training data is converted into a common data format on which the machine learning model can be implemented.

Once the training model is standardized, the method 500 proceeds to the next set of steps which the corrector 208 executes in succession. In other words, the corrector 208 trains different machine learning models for each column of the first dataset. In the illustrated example, the corrector 208 performs the tasks of block 512. For instance, the corrector 208 trains an elasticnet model with the normal dataset at block 512-1. As may be understood, the normal dataset is the training data that is not normalized or standardized. In addition, upon the training model, the corrector 208 compares an output given by the elasticnet model with the output to find a root-mean square error (R1). Thereafter, at block 512-2, the corrector 208 uses the normalized dataset to train the elasticnet model. Once trained, the corrector 208 finds another root-mean square error (R2). Thereafter, at block 512-3, the corrector 208 uses the standardized dataset to train the elasticnet model. Once trained, the corrector 208 compares an output given by the elasticnet model with the output to find another root-mean square error (R3).

At block 512-4, the corrector 208 compares R1, R2, and R3 and determines the lowest of three root-mean square errors. Further, at block 512-5, the corrector 208 gets a list of the records from the elasticnet model.

At block 514, the corrector 208 executes the K-Nearest Neighbor (KNM) model on the aforementioned dataset. For instance, the corrector 208 trains a KNM model with the normal dataset at block 514-1. As may be understood, the normal dataset is the training data that is not normalized or standardized. In addition, upon the training model, the corrector 208 finds a root-mean square error (R1). Thereafter, at block 514-2, the corrector 208 uses the normalized dataset to train the KNM model. Once trained, the corrector 208 compares an output given by the KNM model with the output to find another root-mean square error (R2). Thereafter, at block 514-3, the corrector 208 uses the standardized dataset to train the KNM model. Once trained, the corrector 208 compares an output given by the KNM model with the output to find another root-mean square error (R3).

At block 514-4, the corrector 208 compares R1, R2, and R3 and determines the lowest of three root-mean square errors. Further, at block 514-5, the corrector 208 gets a list of the records from the KNM model.

At block 516, the corrector 208 executes the random forest model on the aforementioned dataset. For instance, the corrector 208 trains a random forest model with the normal dataset at block 516-1. As may be understood, the normal dataset is the training data that is not normalized or standardized. In addition, upon the training model, the corrector 208 compares an output given by the random forest model with the output to find a root-mean square error (R1). Thereafter, at block 516-2, the corrector 208 uses the normalized dataset to train the random forest model. Once trained, the corrector 208 compares an output given by the random forest model with the output to find another root-mean square error (R2). Thereafter, at block 516-3, the corrector 208 uses the standardized dataset to train the random forest model. Once trained, the corrector 208 compares an output given by the random forest model with the output to find another root-mean square error (R3).

At block 516-4, the corrector 208 compares R1, R2, and R3 and determines the lowest of three root-mean square errors. Further, at block 516-5, the corrector 208 gets a list of the records from the random forest model.

At block 518, the corrector 208 executes the Gradient Boosting Machine (GBM) model on the aforementioned dataset. For instance, the corrector 208 trains the GBM model with the normal dataset at block 518-1. As may be understood, the normal dataset is the training data that is not normalized or standardized. In addition, upon the training model, the corrector 208 finds a root-mean square error (R1). Thereafter, at block 518-2, the corrector 208 uses the normalized dataset to train the GBM model. Once trained, the corrector 208 compares an output given by the GBM model with the output to find another root-mean square error (R2). Thereafter, at block 518-3, the corrector 208 uses the standardized dataset to train the GBM model. Once trained, the corrector 208 compares an output given by the GBM model with the output to find another root-mean square error (R3).

At block 518-4, the corrector 208 compares R1, R2, and R3 and determines the lowest of three root-mean square errors. Further, at block 518-5, the corrector 208 gets a list of the records from the GBM model.

At block 520, the corrector 208 executes the Light Gradient Boosting Machine model (light-GBM) model on the aforementioned dataset. For instance, the corrector 208 trains the Light-GBM model with the normal dataset at block 520-1. As may be understood, the normal dataset is the training data that is not normalized or standardized. In addition, upon the training model, the corrector 208 finds a root-mean square error (R1). Thereafter, at block 520-2, the corrector 208 uses the normalized dataset to train the Light-GBM model. Once trained, the corrector 208 compares an output given by the Light-GBM model with the output to find another root-mean square error (R2). Thereafter, at block 520-3, the corrector 208 uses the standardized dataset to train the Light-GBM model. Once trained, the corrector 208 compares an output given by the Light-GBM model with the output to find another root-mean square error (R3).

At block 520-4, the corrector 208 compares R1, R2, and R3 and determines the lowest of three root-mean square errors. Further, at block 520-5, the corrector 208 gets a list of the records from the Light-GBM model.

Further, at block 522, the corrector 208, the corrector 208 updates the important records, accuracy with each model name in the database of the corrector 208. Further, the corrector 208 moves to block A and thereafter, the proceeds to subsequent sub-steps of blocks 512, 514, 516, 518, and 520.

For instance, at block 512-6, the corrector 208 performs parameter tuning of the elasticnet model for each record in the first dataset. Once the parameter of the machine learning model is tuned, the parameter is updated in the elasticnet model and the least RMSE and Standard Deviation is computed at block 512-7. Thereafter, at block 512-8, the corrector 208 determines if there are any features left in the database. In case the feature is left, the corrector 208 executes the steps of block 512-6 and 516-7 again. On the other hand, in cases no features are left, the corrector 208 moves to block 516-8 where the corrector 208 finds the elasticnet model with the best accuracy and least RSME and standard deviation.

At block 514-0, the corrector 208 determines the K value for tuning the parameters of the SVM model. At block 514-6, the corrector 208 performs parameter tuning of the KNM model for each record in the first dataset. Once the parameter of the machine learning model is tuned, the parameter is updated in the KNM model and the least RMSE and Standard Deviation is computed at block 514-7. Thereafter, at block 514-8, the corrector 208 determines if there are any features left in the database. In case the feature is left, the corrector 208 executes the steps of block 514-6 and 516-7 again. On the other hand, in cases no features are left, the corrector 208 moves to block 516-9 where the corrector 208 finds the KNM model with the best accuracy and least RSME and standard deviation.

At block 516-6, the corrector 208 performs parameter tuning of the random forest model for each record in the first dataset. Once the parameter of the machine learning model is tuned, the parameter is updated in the random forest model and the least RMSE and Standard Deviation is computed at block 516-7. Thereafter, at block 516-8, the corrector 208 determines if there are any features left in the database. In case the feature is left, the corrector 208 executes the steps of block 516-6 and 516-7 again. On the other hand, in cases no features are left, the corrector 208 moves to block 516-9 where the corrector 208 finds the random forest model with the best accuracy and least RSME and standard deviation.

At block 518-6, the corrector 208 performs parameter tuning of the GBM model for each record in the first dataset. Once the parameter of the machine learning model is tuned, the parameter is updated in the GBM model and the least RMSE and Standard Deviation is computed at block 518-7. Thereafter, at block 518-8, the corrector 208 determines if there are any features left in the database. In case the feature is left, the corrector 208 executes the steps of block 518-6 and 518-7 again. On the other hand, in cases no features are left, the corrector 208 moves to block 518-9 where the corrector 208 finds the GBM model with the best accuracy and least RSME and standard deviation.

A block 520-6, the corrector 208 performs parameter tuning of the light-GBM model for each record in the first dataset. Once the parameter of the machine learning model is tuned, the parameter is updated in the light-GBM model and the least RMSE and Standard Deviation is computed at block 518-7. Thereafter, at block 520-8, the corrector 208 determines if there are any features left in the database. In case the feature is left, the corrector 208 executes the steps of block 520-6 and 520-7 again. On the other hand, in cases no features are left, the corrector 208 moves to block 520-9 where the corrector 208 finds the light-GBM model with the best accuracy and least RSME and standard deviation.

In the illustrated example, block 512-9, 514-9, 516-9, 518-9, and 520-9 are executed simultaneously to find the best model with the best accuracy with least RSME and standard deviation. The corrector 208 finds the best model by comparing the RSME and standard deviation and selects the model with the least RSME and standard deviation. Once the best model is identified, the corrector 208, at block 524, stores the selected model in the database as the optimal correction technique. Optionally, at block 526, the corrector 208 generates a second dataset using the selected model.

Figure 6A:
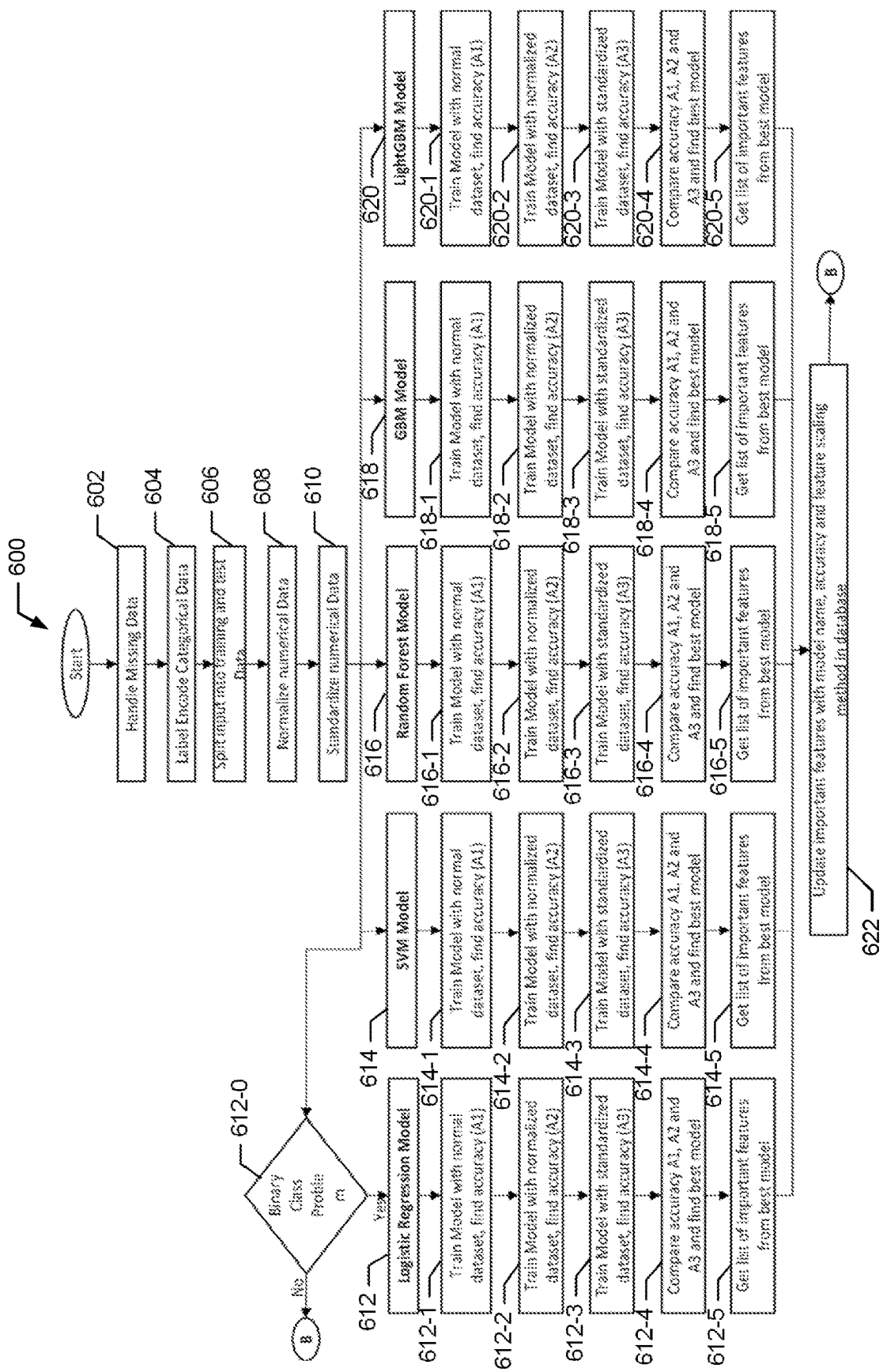
FIGS. 6a and 6b illustrate a method for identifying an optimal correction technique by the corrector for alphanumerical data, according to an example embodiment of the present disclosure.
Figure 6B:
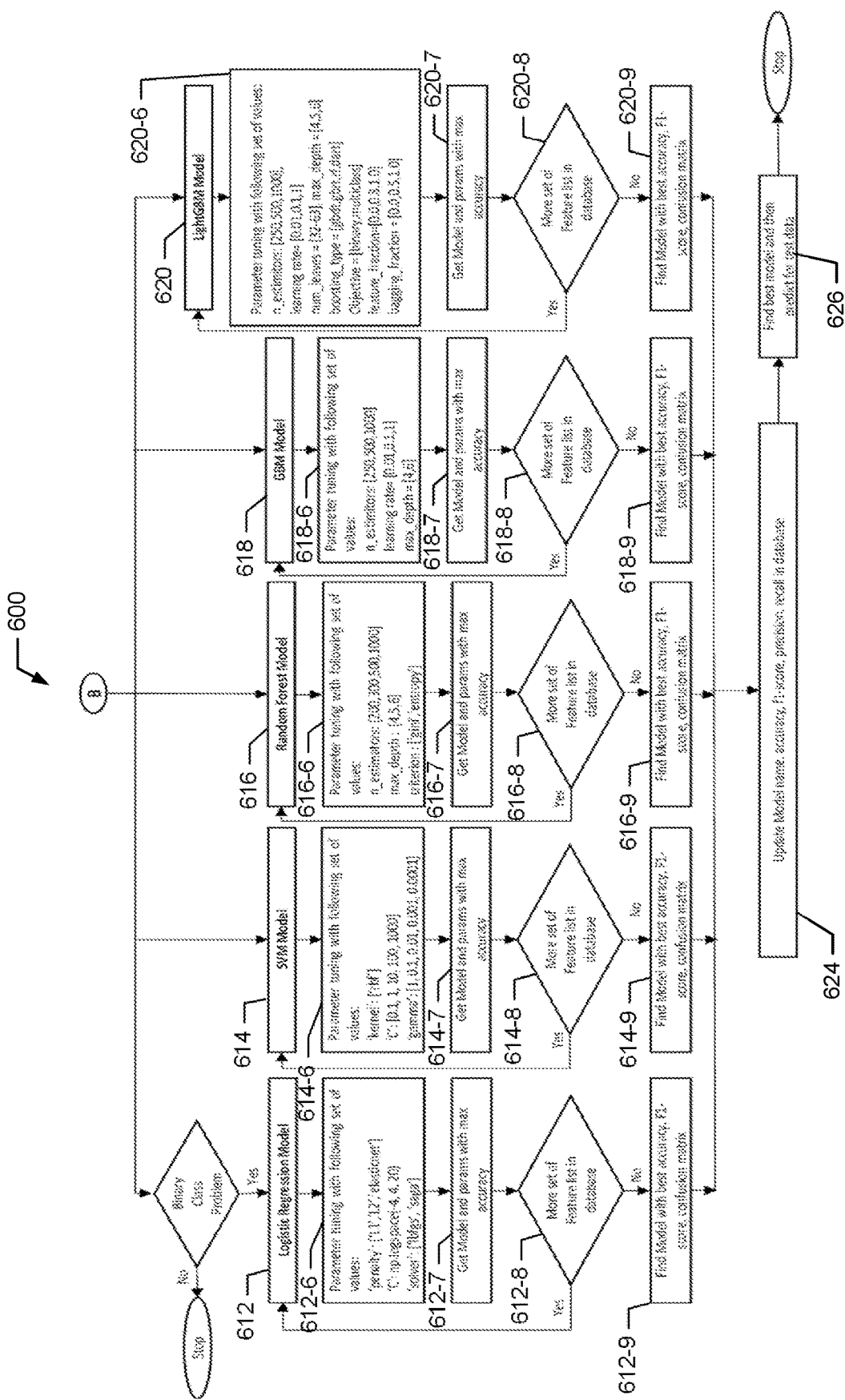

As mentioned before, in case the data type is alphanumeric or categorical in nature, the corrector 208 performs the classifier steps to determine the optimal correction technique. A method 600 depicting the steps performed by the corrector 208 to identify the optimal correction technique for alphanumerical data or categorical data is explained with reference to FIGS. 6a and 6b. Method 600 begins at step 602 where the missing data in the first dataset is handled. As part of handling the missing data, the anomaly in the first dataset is identified. The identification of the anomalies may be based on the data veracity score generated by the veracity generator 206. Upon identification of the anomalies, the method moves at step 604, at which the data in the first dataset is labeled and encoded so that the machine learning model can be applied to the data in the first dataset. Thereafter, at step 606, the first dataset is split into training data and test data. The training data may be understood as the data that is used to train the machine learning model while the test data or the validation data is the data that is used to compare an output of the machine learning model after the machine learning model is trained. An example of the test data can be the data that is complete, correct, and unique. Once the first dataset is split between the training dataset and test dataset, the method 600 moves to the next block 608 where the training data is normalized. The training data can be normalized by a variety of known techniques that rescales the value of each record in the range between 0 and 1. Thereafter, at block 610, the training data is standardized in the structure of the training data is converted into a common data format on which the machine learning model can be implemented.

Once the training model is standardized, the method 600 proceeds to the next set of steps which the corrector 208 executes in succession. In other words, the corrector 208 trains different machine learning models for each column of the first dataset. In the illustrated example, the corrector 208 performs the tasks of block 612. For instance, the corrector 208 determines if there is any binary problem clause in the dataset at block 612-0. In case the binary problem clause does not exist, the methods steps of block 612 ends. On the other hand, in case the binary problem exists, the method 600 moves to block 612-1 where the corrector 208 trains a logistic regression model with the normal dataset. As may be understood, the normal dataset is the training data that is not normalized or standardized. In addition, upon the training model, the corrector 208 compares an output given by the logistic regression model with the output to find an accuracy (A1). Thereafter, at block 612-2, the corrector 208 uses the normalized dataset to train the logistic regression model. Once trained, the corrector 208 finds another accuracy (A2). Thereafter, at block 612-3, the corrector 208 uses the standardized dataset to train the logistic regression model. Once trained, the corrector 208 compares an output given by the logistic regression model with the output to find another accuracy (A3).

At block 612-4, the corrector 208 compares A1, A2, and A3 and determines the highest of three accuracies. Further, at block 612-5, the corrector 208 gets a list of the records from the logistic regression model.

At block 614, the corrector 208 executes the Support Vector Machine (SVM) model on the aforementioned dataset. For instance, the corrector 208 trains an SVM model with the normal dataset at block 614-1. As may be understood, the normal dataset is the training data that is not normalized or standardized. In addition, upon the training model, the corrector 208 finds an accuracy (A1). Thereafter, at block 614-2, the corrector 208 uses the normalized dataset to train the SVM model. Once trained, the corrector 208 compares an output given by the SVM model with the output to find another accuracy (A2). Thereafter, at block 614-3, the corrector 208 uses the standardized dataset to train the SVM model. Once trained, the corrector 208 compares an output given by the SVM model with the output to find another accuracy (A3).

At block 614-4, the corrector 208 compares A1, A2, and A3 and determines the highest of three accuracies. Further, at block 614-5, the corrector 208 gets a list of the records from the SVM model.

At block 616, the corrector 208 executes the random forest model on the aforementioned dataset. For instance, the corrector 208 trains a random forest model with the normal dataset at block 616-1. As may be understood, the normal dataset is the training data that is not normalized or standardized. In addition, upon the training model, the corrector 208 compares an output given by the random forest model with the output to find an accuracy (A1). Thereafter, at block 616-2, the corrector 208 uses the normalized dataset to train the random forest model. Once trained, the corrector 208 compares an output given by the random forest model with the output to find another accuracy (A2). Thereafter, at block 616-3, the corrector 208 uses the standardized dataset to train the random forest model. Once trained, the corrector 208 compares an output given by the random forest model with the output to find another accuracy (A3).

At block 616-4, the corrector 208 compares A1, A2, and A3 and determines the highest of three accuracies. Further, at block 616-5, the corrector 208 gets a list of the records from the random forest model.

At block 618, the corrector 208 executes the Gradient Boosting Machine (GBM) model on the aforementioned dataset. For instance, the corrector 208 trains the GBM model with the normal dataset at block 618-1. As may be understood, the normal dataset is the training data that is not normalized or standardized. In addition, upon the training model, the corrector 208 finds an accuracy (A1). Thereafter, at block 618-2, the corrector 208 uses the normalized dataset to train the GBM model. Once trained, the corrector 208 compares an output given by the GBM model with the output to find another accuracy (A2). Thereafter, at block 618-3, the corrector 208 uses the standardized dataset to train the GBM model. Once trained, the corrector 208 compares an output given by the GBM model with the output to find another accuracy (A3).

At block 618-4, the corrector 208 compares A1, A2, and A3 and determines the highest of three accuracies. Further, at block 618-5, the corrector 208 gets a list of the records from the GBM model.

At block 620, the corrector 208 executes the Light Gradient Boosting Machine model (light-GBM) model on the aforementioned dataset. For instance, the corrector 208 trains the Light-GBM model with the normal dataset at block 620-1. As may be understood, the normal dataset is the training data that is not normalized or standardized. In addition, upon the training model, the corrector 208 finds an accuracy (A1). Thereafter, at block 620-2, the corrector 208 uses the normalized dataset to train the Light-GBM model. Once trained, the corrector 208 compares an output given by the Light-GBM model with the output to find another accuracy (A2). Thereafter, at block 620-3, the corrector 208 uses the standardized dataset to train the Light-GBM model. Once trained, the corrector 208 compares an output given by the Light-GBM model with the output to find another accuracy (A3).

At block 620-4, the corrector 208 compares A1, A2, and A3 and determines the highest of three accuracies. Further, at block 620-5, the corrector 208 gets a list of the records from the Light-GBM model.

Further, at block 622, the corrector 208, the corrector 208 updates the important records, accuracy with each model name in the database of the corrector 208. Further, the corrector 208 moves to block A and, thereafter, proceeds to subsequent sub-steps of blocks 612, 614, 616, 618, and 620.

For instance, the corrector 208 executes block 612-0 to recheck if the updated model has a binary problem clause. Further, at block 612-6, the corrector 208 performs parameter tuning of the logistic regression model for each record in the first dataset. Once the parameter of the machine learning model is tuned, the parameter is updated in the logistic regression model and the maximum accuracy is computed at block 612-7. Thereafter, at block 612-8, the corrector 208 determines if there are any features left in the database. In case the feature is left, the corrector 208 executes the steps of blocks 612-6 and 612-7 again. On the other hand, in cases no features are left, the corrector 208 moves to block 612-9 where the corrector 208 finds the logistic regression model with the best accuracy and maximum accuracy.

At block 614-0, the corrector 208 determines the K value for tuning the parameters of the SVM model. Thereafter, at block 614-6, the corrector 208 performs parameter tuning of the SVM model for each record in the first dataset. Once the parameter of the machine learning model is tuned, the parameter is updated in the SVM model and the maximum accuracy is computed at block 614-7. Thereafter, at block 614-8, the corrector 208 determines if there are any features left in the database. In case the feature is left, the corrector 208 executes the steps of block 614-6 and 616-7 again. On the other hand, in cases no features are left, the corrector 208 moves to block 616-9 where the corrector 208 finds the SVM model with the best accuracy and maximum accuracy.

At block 616-6, the corrector 208 performs parameter tuning of the random forest model for each record in the first dataset. Once the parameter of the machine learning model is tuned, the parameter is updated in the random forest model and the maximum accuracy is computed at block 612-7. Thereafter, at block 616-8, the corrector 208 determines if there are any features left in the database. In case the feature is left, the corrector 208 executes the steps of block 616-6 and 616-7 again. On the other hand, in cases no features are left, the corrector 208 moves to block 616-9 where the corrector 208 finds the random forest model with the best accuracy and maximum accuracy.

At block 618-6, the corrector 208 performs parameter tuning of the GBM model for each record in the first dataset. Once the parameter of the machine learning model is tuned, the parameter is updated in the GBM model and the maximum accuracy is computed at block 618-7. Thereafter, at block 618-8, the corrector 208 determines if there are any features left in the database. In case the feature is left, the corrector 208 executes the steps of block 618-6 and 618-7 again. On the other hand, in cases no features are left, the corrector 208 moves to block 618-9 where the corrector 208 finds the GBM model with the best accuracy and maximum accuracy.

At block 620-6, the corrector 208 performs parameter tuning of the light-GBM model for each record in the first dataset. Once the parameter of the machine learning model is tuned, the parameter is updated in the light-GBM model and the maximum accuracy is computed at block 620-7. Thereafter, at block 620-8, the corrector 208 determines if there are any features left in the database. In case the feature is left, the corrector 208 executes the steps of block 620-6 and 620-7 again. On the other hand, in cases no features are left, the corrector 208 moves to block 620-9 where the corrector 208 finds the light-GBM model with the best accuracy and maximum accuracy.

In the illustrated example, block 612-9, 614-9, 616-9, 618-9, and 620-9 are executed simultaneously to find the best model with the best accuracy with maximum accuracy. The corrector 208 finds the best model by comparing the RSME and selects the model with maximum accuracy. Once the best model is identified, the corrector 208, at block 624, stores the selected model in the database as the optimal correction technique. Optionally, at block 626, the corrector 208 generates a second dataset using the selected model.

Figure 7:
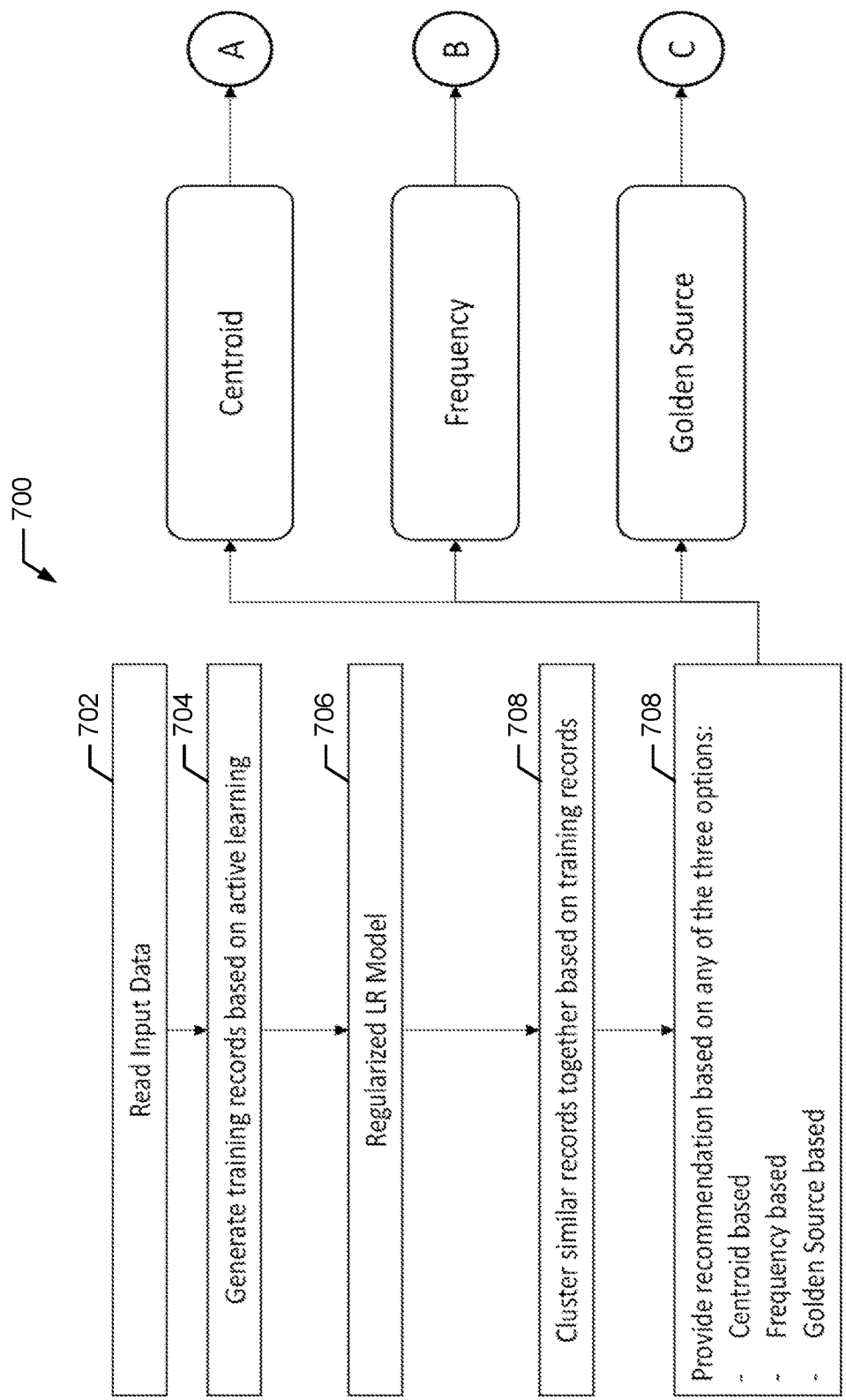
FIG. 7 illustrates a method depicting processing of unstructured first dataset, according to an example embodiment of the present disclosure.

As mentioned before, the corrector 208 performs different sets of steps to determine the optimal correction technique and improve the first dataset when the data in the first dataset is unstructured. One of the techniques implemented by the corrector 208 is data clustering. FIG. 7 illustrates a method 700 depicting an overview of the steps performed on the unstructured first dataset. The method 700 begins at block 702 where the first dataset is received and read by the corrector 208. Thereafter, at block 704, the corrector 208 receives a training record that includes predefined and accurate records which acts as a reference to predict the missing/incorrect records. Further, at block 706, the corrector 208 invokes a logistic regression model (LR) model to predict the missing/incorrect records. Thereafter, the data collector 208 identifies clusters of similar that are identified using the LR model at block 708. Once the clusters, the corrector 208, at block 710 recommends the record values based on either centroid-based calculation, frequency-based calculation, or master-data based calculation, each of which is explained with reference to FIGS. 12, 13, and 14.

Figure 8:
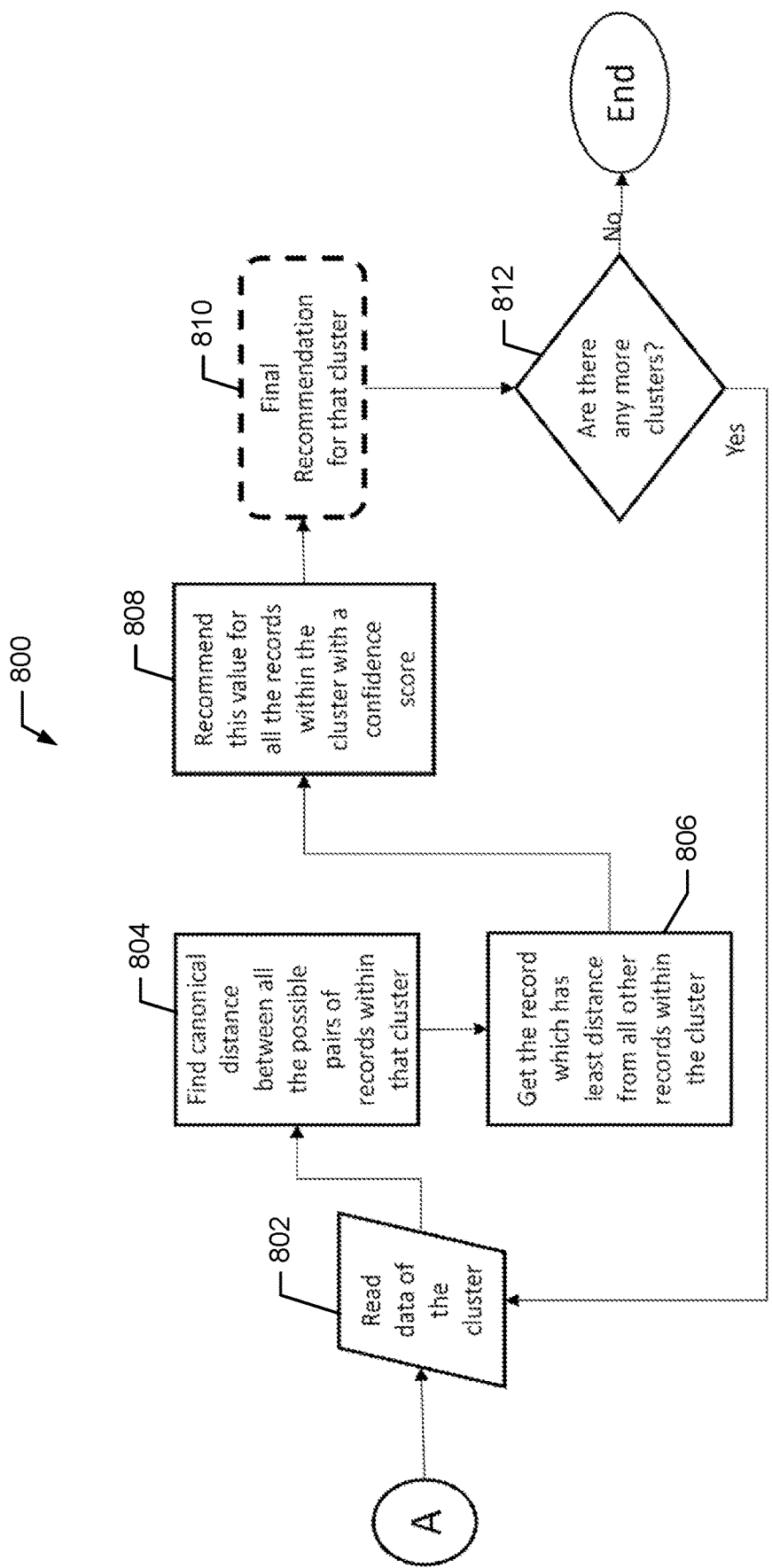
FIG. 8 illustrates a method for predicting missing/incorrect records using a centroid-based calculation, according to an example embodiment of the present disclosure.

FIG. 8 illustrates a method 800 for predicting missing/incorrect records using a centroid-based calculation. The method begins at block 802 where the corrector 208 reads the data from the cluster, and thereafter, at block 804, finds a canonical distance between all possible pairs of similar records within the cluster. Once the corrector 208 has found the canonical distance, the corrector 208, at block 806, determines the record which has the least canonical distance from all other records. Once the record is determined, the corrector 208, at block 808, recommends the value of the determined record as the value for all the records within the cluster with a confidence score. Finally, the corrector 208 recommends that value as the final recommendation at block 810. Thereafter, the corrector 208 checks if there are any more clusters at block 812. In case there any cluster, the corrector 208 performs the steps in block 802 to 810 of the next cluster. In case no cluster remains, the corrector 208 ends the method 800.

Figure 9:
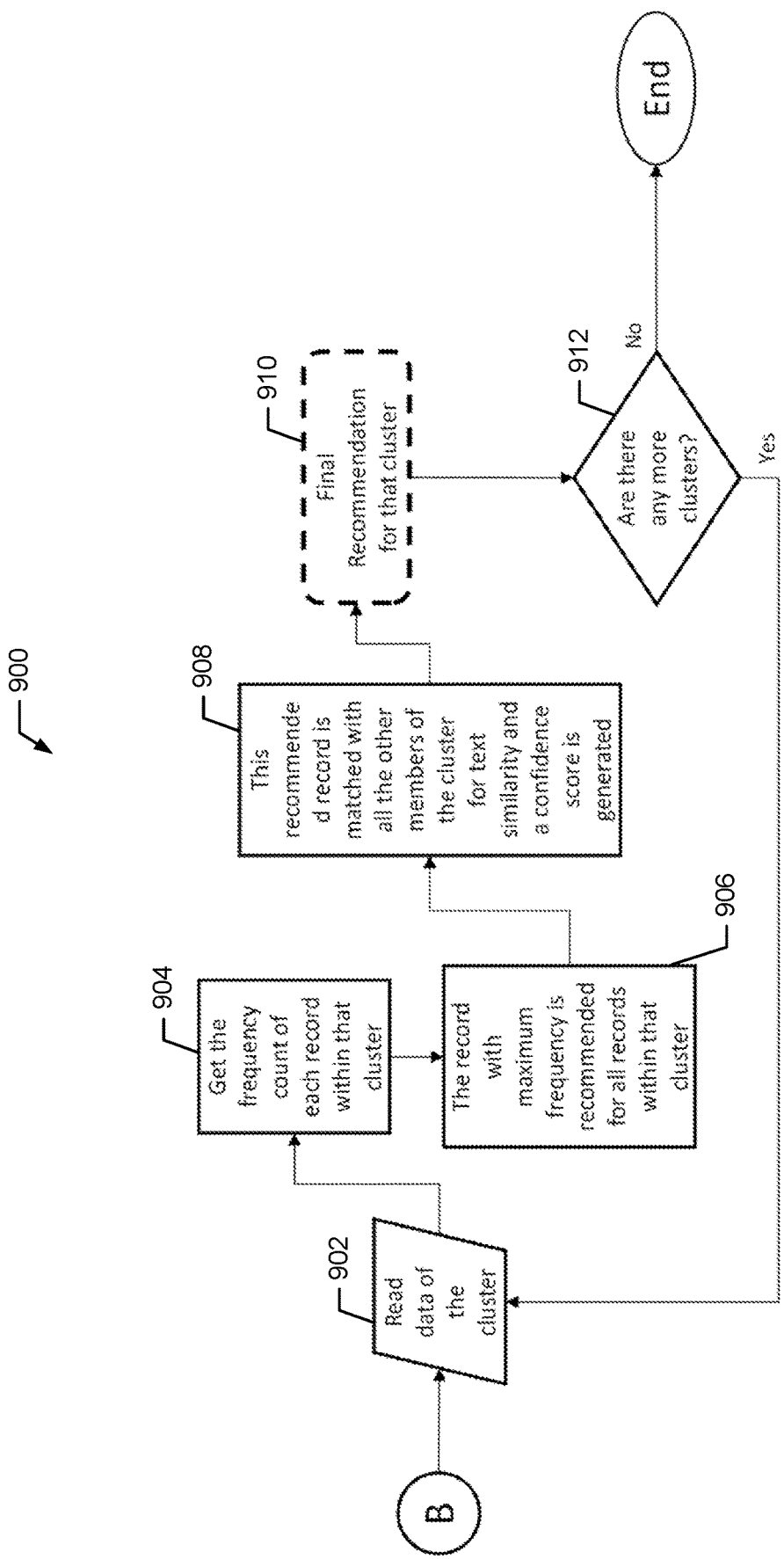
FIG. 9 illustrates a method for predicting missing/incorrect records using a frequency-based calculation, according to an example embodiment of the present disclosure

FIG. 9 illustrates a method 900 for predicting missing/incorrect records using a frequency-based calculation, according to an example embodiment of the present disclosure. The method begins at block 1302 where the corrector 208 reads the data from the cluster, and thereafter, at block 1304, finds frequency count of each record within the cluster. Once the corrector 208 has found the frequency count, the corrector 208, at block 1206, determines the record which has the maximum frequency count from all other records. Once the record is determined, the corrector 208, at block 1208, recommends the value of the determined record as the value for all the records within the cluster with a confidence score. Finally, the corrector 208 recommends that value as the final recommendation at block 910. Thereafter, the corrector 208 checks if there are any more clusters at block 912. In case there any cluster, the corrector 208 performs the steps in block 1202 to 910 of the next cluster. In case no cluster remains, the corrector 208 ends the method 900.

Figure 10:
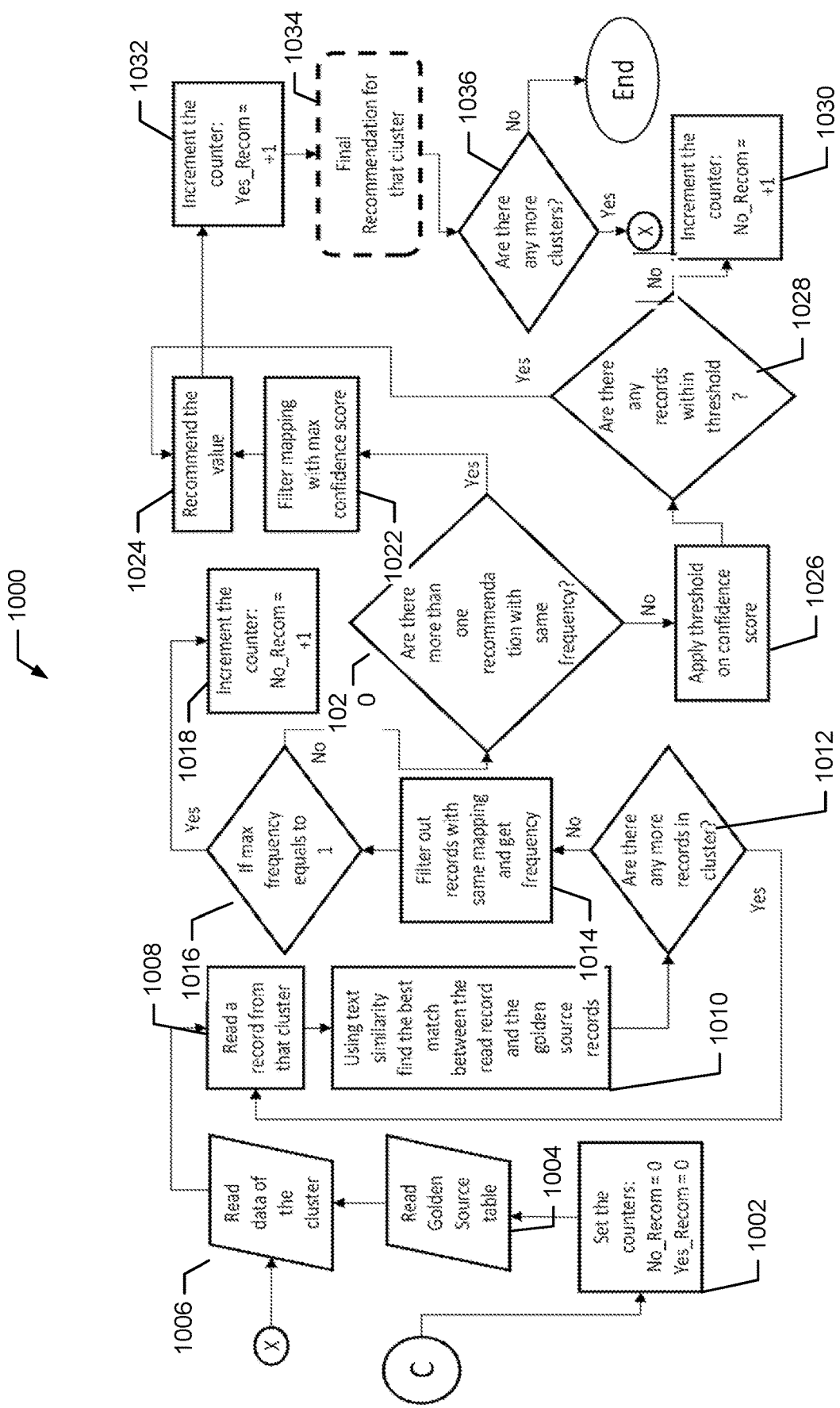
FIG. 10 illustrates a method for predicting missing/incorrect records using a golden source data-based calculation, according to an example embodiment of the present disclosure.

FIG. 10 illustrates a method 1000 for predicting missing/incorrect records using a golden source data-based calculation, according to an example embodiment of the present disclosure. The method 1000 begins at block 1002 where the corrector 208 initiates the correction technique by setting two counters namely, No_recom and Yes_recom at zero. Thereafter, at block 1004, the corrector 208 reads the golden source data file that holds the correction records. At block 1006, the corrector 208 selects one of the clusters created by using the LR model and, at block 1008, reads the records in the cluster. Thereafter, at block 1010, the corrector 208 uses a text similarity technique to find the best match between the record in the cluster and the record in the golden source data. In addition, the corrector 208 awards the confidence score which is indicative of the degree of similarity. Upon finding the best match, at block 1012, the corrector 208 checks if there are any more records in the clusters. In case there are any pending records, the corrector 208 performs the steps of block 1008 and 1010. On the other hand, in case there is no more record, the corrector 208, at block 1014, filters out the records with the same mapping and record the count of such record as their frequency.

Thereafter, the corrector 208 filters the records that have no mapping. In order to that, the corrector 208, at block 1016, checks if there are any records that have frequency value as 1. In case the frequency is 1, the corrector 208, at block 1018 increments the counter No_recom as =+1. On the other hand, in case the frequency is not 1, the corrector 208, at block 1020, check if there are any records that have the same frequency. In case there are records that have the same frequency, the corrector 208, at block 1022, filters the records on the basis of confidence score awarded to the record during the text-similarity technique. Thereafter, the corrector 208 recommends the record with the highest confidence score at block 1024.

On the other hand, in case there are no records with the same frequency, the corrector 208, at block 1026, applies a threshold limit on the confidence score to select the record with above the threshold. Thereafter, at block 1028, the corrector 208 checks if there are records within the threshold. In case there is no record within the threshold, the corrector 208, at block 1030 increments the counter of No_recom=+1. On the other hand, in case there are records within the threshold, the corrector 208 recommends the record at block 1024.

In an example, upon recommending the record, the corrector 208, at block 1032, increment the counter Yes_recom=+1 and thereafter, at block 1034, provides a final recommendation for the cluster. Finally, at block 1036, checks if there are any clusters left. In case there are other clusters, the corrector 208 executes the steps of block subsequent to block X. On the other hand, in case there are no more clusters, the corrector 208 concludes the method 1000.

According to the present disclosure, the corrector 208 can also use natural language processing techniques as the optimal correction technique. A method of how natural language processing is implemented is explained with respect to FIG. 15.

Figure 11:
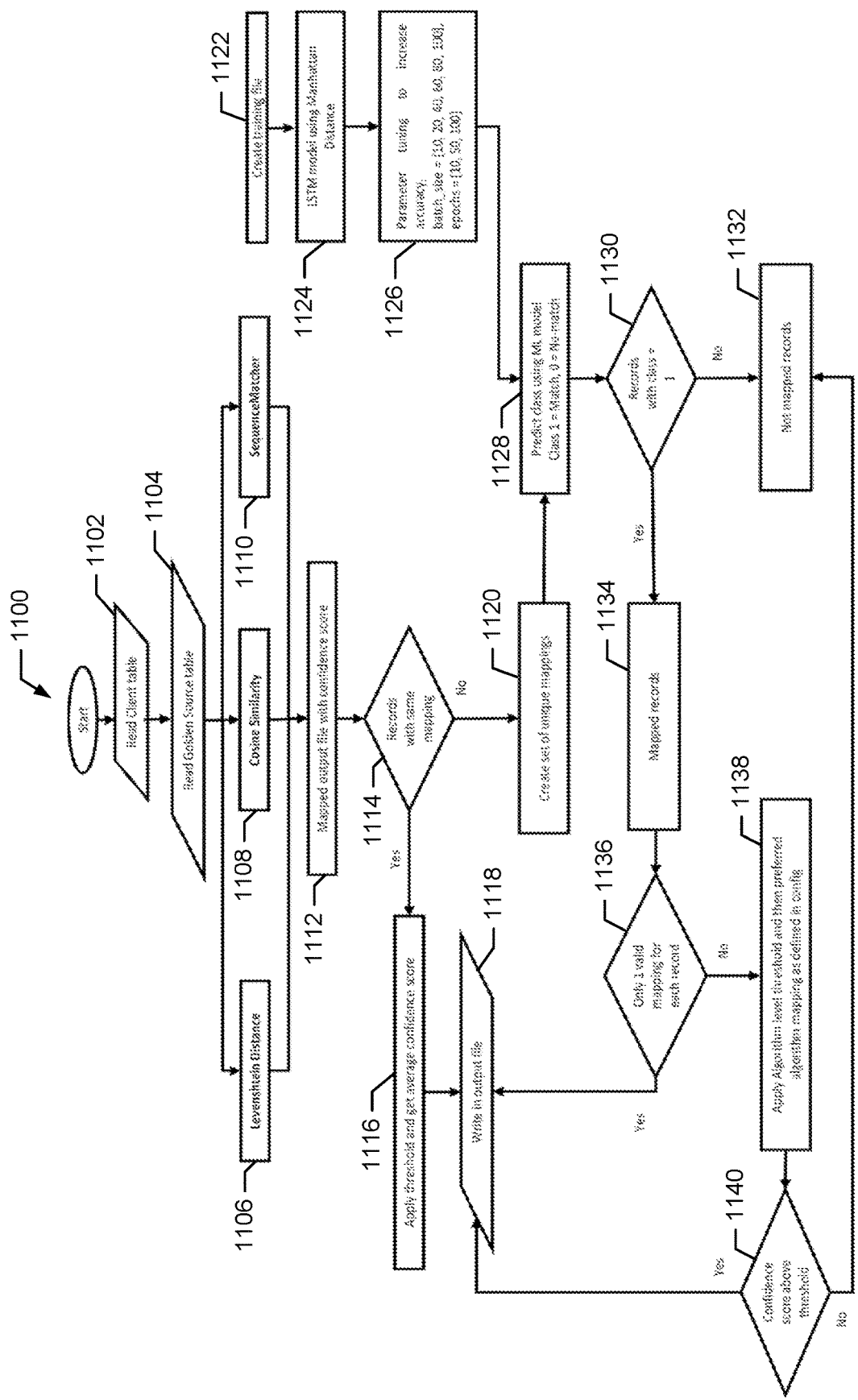
FIG. 11 illustrates a method for applying the natural language processing technique to remove anomalies in the first dataset, according to an example embodiment of the present disclosure.

FIG. 11 illustrates a method 1100 for applying the natural language processing technique to remove the anomalies in the first dataset, according to an example embodiment of the present disclosure. The method begins at block 1102 at which the corrector 208 reads the records in the first dataset. Thereafter, at block 1104, the corrector 208 reads the records of the master file. Once read, the corrector 208 invokes different natural language processing to process the first dataset and the golden source data. In an example, the corrector 208 invokes Levenshtein distance technique, cosine similarity technique, and sequence matter at block 1106, 1108, and 1110 respectively. At block 1112, the output in the form of mapping is combined with confidence score awards by the aforementioned technique. Thereafter, at block 1114, the corrector 208 checks if there are records with the same mapping. In case there are records with the same mapping, the corrector 208, at block 1116, the corrector 208 applies a threshold on the confidence score and finally, at block 1118, provides the mapped record as the output.

On the other hand, in case the corrector 208 determines that there are no records with the same mappings, the corrector 208 creates a unique set of mappings at block 1120. In order to process the unique set of mappings, the corrector 208 creates a training file at block 1122 and uses the training file at block 1124 to train a long short-term memory (LSTM) model using Manhattan distance technique. Once trained, the long short-term memory, at block 1126 tunes the parameters of the LSTM model to increase the accuracy. Once the parameters are tuned, the corrector 208, at block 1128, predicts the class for each record using the LSTM model. Thereafter, the corrector 208 check if the value of the class is 0 or 1 at block 1130. In case the value of the class for the record is not 1, the corrector 208 concludes the method 1100 at block 1132 indicating that there are no mapped records. On the other hand, in case the class value is 1, the corrector 208, at block 1134, map the records and checks there is only one valid mapping for each record at block 1136.

In case there is only one valid mapping for each record, the corrector 208 writes the mapped record as output at block 1118. On the other hand, in case there is more than one valid mapping for each record, the corrector 208, at block 1138, applies an algorithm level threshold and thereafter preferred algorithm mapping on the confidence score. Thereafter, the corrector 208 checks, at block 1140, if there are records that have confidence score higher than the threshold. In case there are records with a higher confidence score, such records are written as output. On the other hand, in case the confidence score is less than the threshold, the corrector 208 concludes the method 1100 indicating that there are no mapped records at block 1132.

Figure 12:
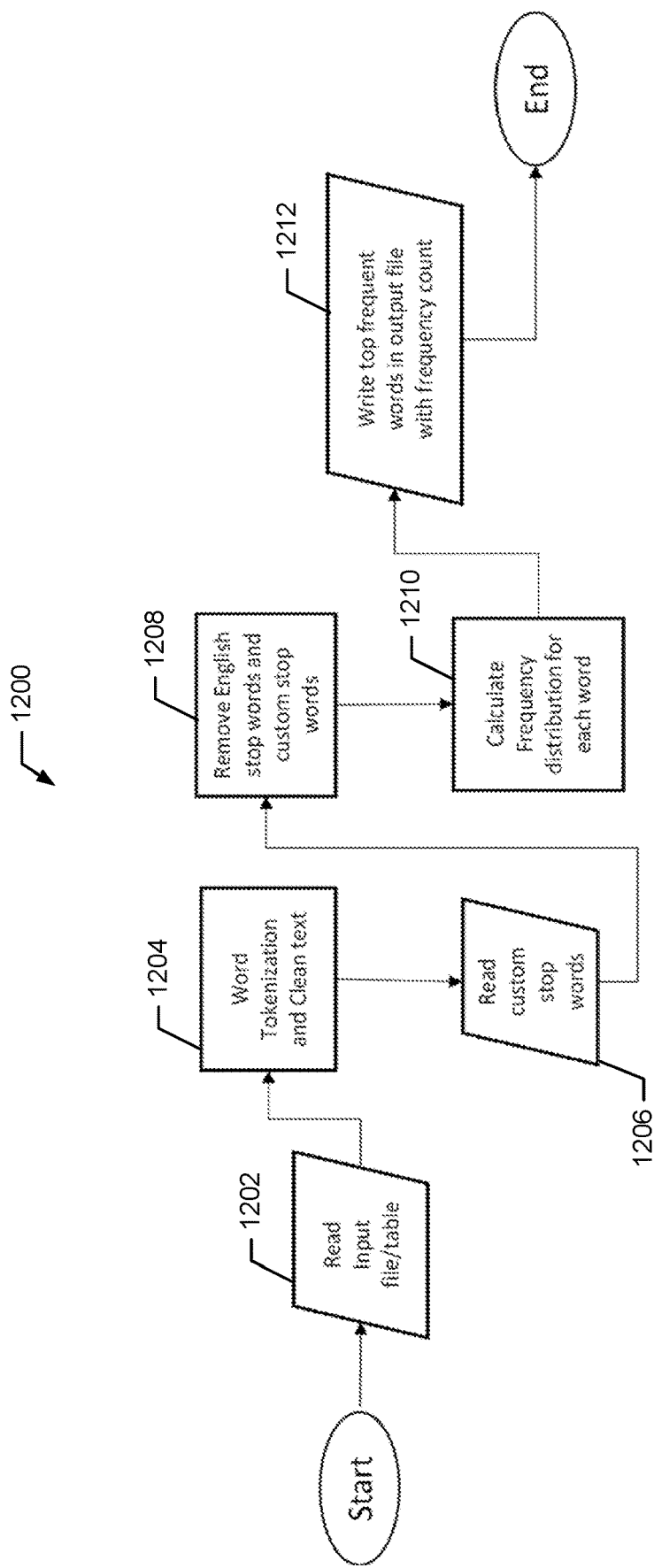
FIG. 12 illustrates a method for removing the anomalies using word cloud generation technique, according to an example embodiment of the present disclosure.

According to an example embodiment of the present disclosure, the corrector 208 may also apply the word cloud generation technique to remove the anomalies. FIG. 12 illustrates a method 1200 for removing anomalies using word cloud generation technique, according to example embodiment of the present disclosure. The method begins at block 1202 where the first dataset is read and thereafter, at block 1204, the corrector 208 executes word tokenization technique in which the large sentences are broken into small words. Once the tokenization technique is implemented, the corrector 208 reads custom word stops stored in the database. Examples of custom word stops are: "yo", "so", "well", "um", "a", "the", "you know", "i mean". Thereafter, the corrector 208, at block 1206, removes the custom stop words. Upon removal of the custom stop words, the corrector 208, at block 1208, calculate the count of each word is record them as their frequency. Finally, at block 1210, the corrector 208 writes the words with the highest frequency as an output along with their frequency. The corrector 208, in an example, may select the top 10 frequency count for writing them as output at block 1212.

According to the present disclosure, the system 102, upon identifying the optimal correction technique, may suggest a dataset that is devoid of the anomalies. In an example, the recommender 310 generates a second dataset using the optimal correction technique in a manner explained above. Thereafter, the second dataset may be analyzed manually by an operator before outputting the second dataset for deriving the insights. One of the way to analyzing the second dataset is by determining second data veracity score for the second dataset. In case the second veracity score is higher than the first data veracity score, then the second dataset is used to derive insights. On the other hand, in case the second veracity score is lower than the first data veracity score, then corrections are made to the second dataset and are shared with the corrector 208 to process the second dataset and identify another optimal correction technique.

Figure 13:
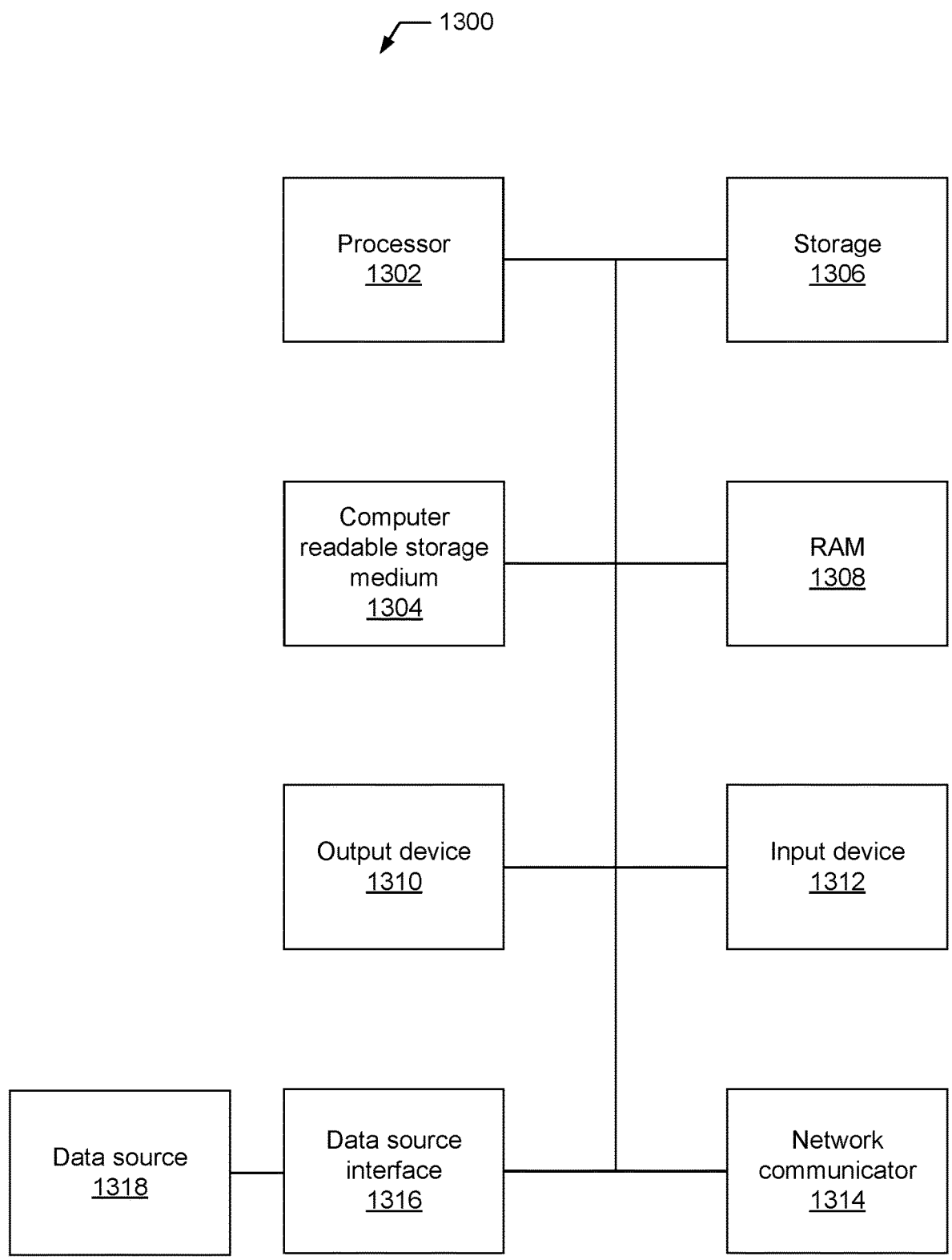
FIG. 13 illustrates a hardware implementation of the system, in accordance with an implementation of the present disclosure.

FIG. 13 illustrates a hardware platform 1300 for implementation of the system 102, according to an example of the present disclosure. For the sake of brevity, construction and operational features of the system 102 which are explained in detail above are not explained in detail herein. Particularly, computing machines such as but not limited to internal/external server clusters, quantum computers, desktops, laptops, smartphones, tablets, and wearables which may be used to execute the system 102 or may have the structure of the hardware platform 102. As illustrated, the hardware platform 1300 may include additional components not shown and that some of the components described may be removed and/or modified. For example, a computer system 102 with multiple GPUs may be located on external-cloud platforms including Amazon Web Services, or internal corporate cloud computing clusters, or organizational computing resources, etc.

The hardware platform 1300 may be a computer system such as the system 102 that may be used with the embodiments described herein. The computer system may represent a computational platform that includes components that may be in a server or another computer system. The computer system may execute, by a processor such as the processor 212 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 212 that executes software instructions or code stored on a non-transitory computer-readable storage medium 1310 to perform methods of the present disclosure. The software code includes, for example, instructions to gather data and documents and analyze documents. In an example, the retriever 202, the profiler 204, the veracity generator 206, the corrector 208, and the recommender 210 may be software codes or components performing these steps.

The instructions on the computer-readable storage medium 1310 are read and stored the instructions in storage 1315 or in random access memory (RAM). The storage 1315 may provide a space for keeping static data where at least some instructions could be stored for later execution. The stored instructions may be further compiled to generate other representations of the instructions and dynamically stored in the RAM such as RAM 1320. The processor 212 may read instructions from the RAM 1320 and perform actions as instructed.

The computer system may further include an output device 1325 to provide at least some of the results of the execution as output including, but not limited to, visual information to users, such as external agents. The output device 1325 may include a display on computing devices and virtual reality glasses. For example, the display may be a mobile phone screen or a laptop screen. GUIs and/or text may be presented as an output on the display screen. The computer system may further include an input device 1330 to provide a user or another device with mechanisms for entering data and/or otherwise interact with the computer system. The input device 1330 may include, for example, a keyboard, a keypad, a mouse, or a touchscreen. Each of these output device 1325 and input device 1330 may be joined by one or more additional peripherals. For example, the output device 1325 may be used to display results of the retriever 202, the profiler 204, the veracity generator 206, the corrector 208, and/or the recommender 210.

A network communicator may be provided to connect the computer system 102 to a network and in turn to other devices connected to the network including other clients, servers, data stores, and interfaces, for instance. A network communicator may include, for example, a network adapter such as a LAN adapter or a wireless adapter. The computer system may include a data source interface 1340 to access the data source 1345. The data source 1345 may be an information resource. As an example, a database of exceptions and rules may be provided as the data source 1345. Moreover, knowledge repositories and curated data may be other examples of the data source 1345.

Figure 14:
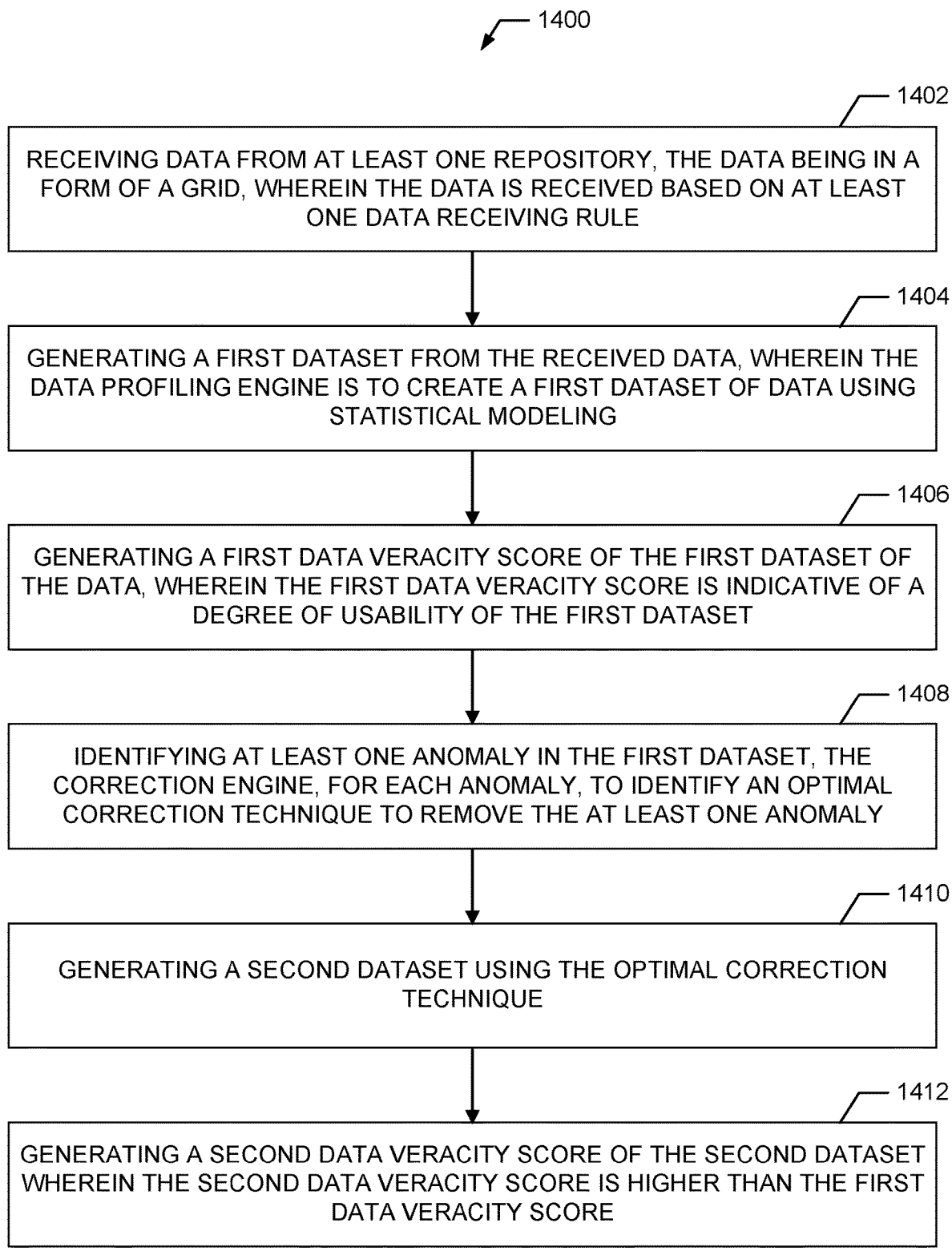
FIG. 14 illustrates a process flow to enhance veracity of data, in accordance with an implementation of the present disclosure.

FIG. 14 illustrates a method 1400 for improving a dataset veracity, according to example embodiment of the present disclosure. The method 1400 can be implemented by system 102. The method may be described in the general context of computer-executable instructions embodied in a computer-readable medium. Generally, computer-executable instructions can include routines, programs, objects, components, data structures, procedures, modules, functions, etc., which perform particular functions or implement particular abstract data types. The method may also be practiced in a distributed computing environment where functions are performed by remote processing devices that are linked through a communications network. In a distributed computing environment, computer-executable instructions may be located in both local and remote computer storage media, including memory storage devices.

The order in which the method is described is not intended to be construed as a limitation, and any number of the described method blocks can be combined in any order to implement the method or an alternative method. Additionally, individual blocks may be deleted from the method without departing from the spirit and scope of the methods, systems, and devices described herein. Furthermore, the method can be implemented in any suitable hardware, software, firmware, or combination thereof.

Method 1400 begins at block 1402 when the data is received from a repository. In an example, the received data is in the form of a grid and is received based on one or more data receiving rules.

At block 1404, a first dataset is generated based on the received data. In an example, the first dataset is created using statistical modeling.

At block 1406, a first data veracity score for the first dataset is obtained. In an example, the first data veracity score for the first dataset. The first data veracity score is indicative of the degree of usability of the first dataset.

At block 1408, once the first data veracity score for the first dataset is generated, one or more anomalies within the first dataset are identified based on the first dataset. In addition, for each anomaly, a correction technique. A manner by which the system 102 determines the correction technique is explained in subsequent paragraphs.

At block 1410, once the optimal correction technique is identified, a second dataset is generated using the optimal correction technique. In an example, the optimal correction technique is implemented on the first dataset to obtain the second dataset.

At block 1412, once the second dataset is obtained, a second data veracity score is generated which is higher than the first data veracity score, thereby enhancing the veracity of corresponding data.

The present disclosure also relates to a non-transitory computer-readable medium. The non-transitory computer-readable medium holds the instructions which when executed, causes a processor to receive data from a repository, the data being in a form of a grid, wherein the data based on a data receiving rule. In addition, the non-transitory computer-readable medium holds the instructions to generate the first dataset from the received data, wherein the first dataset is generated using statistical modeling. Moreover, the non-transitory computer-readable medium holds the instructions to generate a first data veracity score for the dataset of the data, wherein the data veracity score is indicative of a degree of usability of the dataset.

According to an example, the non-transitory computer-readable medium holds the instructions to identify an anomaly in the first dataset, and for each anomaly, identify a correction technique from amongst a plurality of correction techniques. In addition, the non-transitory computer-readable medium holds the instructions to generate a second dataset using the identified correction technique and to generate a second data veracity score for the second dataset wherein the second data veracity score is higher than the first data veracity score.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (for example, a user may change the size of the user interface, the information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
a processor;
a retriever coupled to the processor to receive data from a repository, wherein the retriever receives the data based on a data receiving rule;
a profiler coupled to the processor to generate a first dataset from the received data, wherein the profiler creates a first dataset of data using statistical modeling;
a veracity generator coupled to the processor to generate a first data veracity score for the first dataset of the data, wherein the first data veracity score is indicative of a degree of usability of the first dataset;
a corrector coupled to the processor to identify an anomaly in the first dataset, wherein the corrector is to identify an optimal correction technique from amongst a plurality of correction techniques to substantially remove the anomaly, wherein, based on a type of the received data, the corrector is to identify one of a machine learning model from amongst a plurality of machine learning models and a statistical data analysis technique from amongst a plurality of statistical data analysis techniques as the optimal correction technique; and a recommender coupled to the processor to generate a second dataset using the optimal correction technique, wherein the veracity generator generates a second data veracity score for the second dataset, the second data veracity score being higher than the first data veracity score.

2. The system as claimed in claim 1, wherein the received data comprises structured data.

3. The system as claimed in claim 2, wherein the structured data comprises a numerical dataset, wherein the corrector is to implement one of an elasticnet Model, a K-Nearest Neighbor (KNM) model, a Random forest model, a Gradient Boosting Machine (GBM) model, and a Light GBM model.

4. The system as claimed in claim 2, wherein the structured data comprises an alphanumerical dataset, wherein the corrector is to implement one of a Logistic regression model, and a Support vector machine (SVM) model, a Random forest model, a Gradient Boosting Machine (GBM) model, and a Light GBM model.

5. The system as claimed in claim 1, wherein, for each anomaly, the corrector is to:
identify test data and training data from the first dataset for each machine learning model from amongst the plurality of machine learning models; and
compare an output of each of the plurality of machine learning models to identify the optimal machine learning model.

6. The system as claimed in claim 1, wherein the received data comprises unstructured data, wherein the corrector, for each anomaly, is to identify one of a k-clustering technique, a natural language processing technique, and a word cloud generation technique as the optimal correction technique.

7. The system as claimed in claim 1, wherein the profiler uses a data profiling technique to generate the first dataset.

8. A method comprising:
receiving, by a processor, a data from a repository, wherein the retriever receives the data based on a data receiving rule;
generating, by the processor, a first dataset from the received data using statistical modeling;
generating, by the processor, a first data veracity score for the dataset of the data, wherein the first data veracity score is indicative of a degree of usability of the dataset;
identifying, by the processor, an anomaly in the first dataset, wherein the identifying comprises ascertaining an optimal correction technique from amongst a plurality of correction techniques to substantially remove the anomaly, wherein the identifying comprises, based on a type of the data, determining one of a machine learning model from amongst a plurality of machine learning models and a statistical data analysis technique from amongst a plurality of statistical data analysis techniques as the optimal correction technique; and
generating, by the processor, a second dataset using the optimal correction technique, wherein the generating comprises generating a second data veracity score for the second dataset, the second data veracity score being higher than the first data veracity score.

9. The method as claimed in claim 8, wherein the received data comprises structured data.

10. The method as claimed in claim 9, wherein the structured data comprises a numerical dataset, and wherein the machine learning model is one of an elasticnet Model, a K-Nearest Neighbor (KNM) model, a Random forest model, a Gradient Boosting Machine (GBM) model, and a Light GBM model.

11. The method as claimed in claim 9, wherein the structured data comprises an alphanumerical dataset, and wherein the machine learning model is one of a Logistic regression model, and a Support vector machine (SVM) model, a Random forest model, a Gradient Boosting Machine (GBM) model, and a Light GBM model.

12. The method as claimed in claim 9, wherein the method further comprises:
identifying, for each anomaly, test data and training data from the first dataset for each machine learning model from amongst the plurality of machine learning models; and
comparing an output of each of the plurality of machine learning model to identify the optimal machine learning model.

13. The method as claimed in claim 8, wherein the received data comprises unstructured data, wherein the method further comprises identifying one of a k-clustering technique, a natural language processing, and a word cloud generation as the optimal correction technique.

14. The method as claimed in claim 8, wherein the first dataset is generated using a data profiling technique.

15. A non-transitory computer medium including computer-readable instructions which, when executed, causes a processor to:
receive data from a repository, wherein the data based on a data receiving rule;
generate a first dataset from the received data, wherein the first dataset is generated using statistical modeling;
generate a first data veracity score for the first dataset of the data, wherein the first data veracity score is indicative of a degree of usability of the first dataset;
identify an anomaly in the first dataset, wherein the processor is to identify an optimal correction technique from amongst a plurality of correction techniques to substantially remove the anomaly, wherein the processor is to determine, based on a type of the data, one of a machine learning model from amongst a plurality of machine learning models and a statistical data analysis technique from amongst a plurality of statistical data analysis techniques as the optimal correction technique; and
generate a second dataset using the identified correction technique, wherein a second data veracity score is generated for the second dataset, the second data veracity score being higher than the first data veracity score.

16. The non-transitory computer medium as claimed in claim 15, wherein the received data comprises one of structured data and unstructured data.

17. The non-transitory computer medium as claimed in claim 16, wherein the structured data comprises a numerical dataset, and wherein the machine learning model is one of an elasticnet Model, a K-Nearest Neighbor (KNM) model, a Random forest model, a Gradient Boosting Machine (GBM) model, and a Light GBM model.

18. The non-transitory computer medium as claimed in claim 16, wherein the structured data comprises an alphanumerical dataset, and wherein the machine learning model is one of a Logistic regression model, and a Support vector machine (SVM) model, a Random forest model, a Gradient Boosting Machine (GBM) model, and a Light GBM model.

19. The non-transitory computer medium as claimed in claim 16, wherein the processor is to:
   identify, for each anomaly, test data and training data from the first dataset for each machine learning model from amongst the plurality of machine learning models; and
   compare an output of each of the plurality of machine learning model to identify the optimal machine learning model.

20. The non-transitory computer medium as claimed in claim 16, wherein the processor is to implement a data profiling technique to generate the first dataset.

* * * * *